(12) United States Patent
Kim et al.

(10) Patent No.: US 7,080,083 B2
(45) Date of Patent: Jul. 18, 2006

(54) EXTENSIBLE STYLESHEET DESIGNS IN VISUAL GRAPHIC ENVIRONMENTS

(76) Inventors: Hong J. Kim, 950 S. Main St. #216, Milpitas, CA (US) 95035; Evan S. Huang, 7634 Orange Blossom Dr., Cupertino, CA (US) 95014

( * ) Notice: Subject to any disclaimer, the term of this patent is extended or adjusted under 35 U.S.C. 154(b) by 485 days.

(21) Appl. No.: 10/325,012

(22) Filed: Dec. 20, 2002

(65) Prior Publication Data

US 2003/0120671 A1  Jun. 26, 2003

Related U.S. Application Data

(60) Provisional application No. 60/343,117, filed on Dec. 21, 2001, provisional application No. 60/349,924, filed on Jan. 17, 2002, provisional application No. 60/349,957, filed on Jan. 17, 2002.

(51) Int. Cl.
*G06F 17/30* (2006.01)
(52) U.S. Cl. .................................... 707/100; 707/104.1
(58) Field of Classification Search .................... 707/1, 707/2, 3, 4, 5, 6, 7, 8, 9, 10, 100, 101, 102, 707/100.1; 715/513
See application file for complete search history.

(56) References Cited

U.S. PATENT DOCUMENTS

| | | | | |
|---|---|---|---|---|
| 6,718,516 B1 * | 4/2004 | Claussen et al. | ............ | 715/513 |
| 6,725,231 B1 * | 4/2004 | Hu et al. | .................... | 707/102 |
| 6,732,109 B1 * | 5/2004 | Lindberg et al. | ............ | 707/101 |
| 6,799,299 B1 * | 9/2004 | Li et al. | ..................... | 715/513 |
| 6,826,568 B1 * | 11/2004 | Bernstein et al. | .............. | 707/6 |
| 6,845,380 B1 * | 1/2005 | Su et al. | ..................... | 707/102 |

* cited by examiner

*Primary Examiner*—Apu Mofiz
*Assistant Examiner*—Yicun Wu
(74) *Attorney, Agent, or Firm*—Joe Zheng

(57) ABSTRACT

Techniques for designing stylesheets using meta-tag and/or associated meta-tag information are described. In one embodiment, a graphic user interface environment including at least two displays is provided. One of the displays is from a commonly used browser or an application to display a target file including a plurality of objects and the other display is used to facilitate the editing of a tree structure. Each of the nodes in the tree structure is associated with one of the objects by associated meta-tag information. Based on the tree structure, a source can be generated. Together with the source file, the stylesheet can be designed in accordance with the displayed target file.

20 Claims, 26 Drawing Sheets

FIG. 1A

```
<?xml version='1.0' encoding='ISO-8859-1' ?>
<root>
    <book>
        <name>C++ Programming</name>
        <author>Michael Kim</author>
    </book>
    <book>
        <name>C++ Programming</name>
        <author>Ivor Horton</author>
    </book>
</root>
```
10
14

FIG. 1B

```
<HTML>
    <head>
        <title>HTML Conversion</title>
    </head>
    <body>
        <p>C++ Programming</p>
        <p> <b>Michael Kim</b> </p>
        <p> <b>Michael Kim</b> </p>
    </body>
</HTML>
```
14
16

```
<!-- ......... Document Type Definitions (DTD) ........-->
<!-- document element -->
<!ELEMENT document  (recipe+)>

<!-- ........ recipe element ......-->
<!ELEMENT recipe  (ingredient+, procedure+, presentation, originate)>
<!ATTLIST recipe title CDATA #REQUIRED>

<!-- ........ ingredient element ......-->
<!ELEMENT ingredient  (#PCDATA)>
<!ATTLIST ingredient amount CDATA #REQUIRED>

<!-- ........ procedure element ......--> <!ELEMENT procedure  (#PCDATA)>
<!ATTLIST procedure step CDATA #IMPLIED>

<!-- ........ presentation element ......-->
<!ELEMENT presentation  (#PCDATA)>

<!-- ........ originate element ......-->
<!ELEMENT originate EMPTY>
<!ATTLIST originate name CDATA #REQUIRED>
<!ATTLIST originate website CDATA #IMPLIED>
<!ATTLIST originate date CDATA #REQUIRED>
<!-- ......... END of DTD ........-->
```

Fig. 2A

```
<?xml version="1.0"?>
<?xml-stylesheet type="text/xsl" href="untitled1.xsl"?>
<document>
  <recipe>
    <title>Green Chili Salsa</title>
    <ingredient>Chopped Tomatoes<amount>1 16-ounce Can</amount></ingredient>
    <ingredient>Chopped Green Chile<amount>3 Tablespoons</amount></ingredient>
    <ingredient>Diced Onions<amount>3 Tablespoons</amount></ingredient>
    <ingredient>Chopped Garlic<amount>1 Tablespoon</amount></ingredient>
    <ingredient>Salt<amount>¼ Teaspoon</amount></ingredient>
    <ingredient>Lime Juice<amount>½ Lime</amount></ingredient>
    <ingredient>Chopped Cilantro<amount>1 Tablespoon</amount></ingredient>
    <procedure>In a medium bowl, mix together all ingredients.</procedure>
    <presentation>Use as a dip, or over grilled vegetables,
or toss with bowtie noodles for an appetizer course.</presentation>
    <originate name = "VeggieLife"><website>www.VeggieLife.com</website>
    <date>November 1997</date></originate>
  </recipe>
</document>
```

```
<?xml version="1.0"?>
<xsl:stylesheet version="1.0" xmlns:xsl="http://www.w3.org/1999/XSL/Transform">
<xsl:template match="/"><xsl:apply-templates/></xsl:template>

<xsl:template match="document"><html><body><xsl:apply-templates/></body></html></xsl:template>

<xsl:template match="recipe"><h1><center><font color="teal">Title: </font><font color="red">
<xsl:value-of select="title"/>
</font></center></h1><h2><center><font color="teal">From: </font>
<font color="gray"><xsl:for-each select="originate" ><xsl:value-of select="@name" /></xsl:for-each>
</font></center></h2><p><center><table bgcolor="ffffc0"><tr><td><font color="teal" size="5">
Ingredient:</font></td></tr><xsl:for-each select="ingredient">
<tr><td><xsl:value-of select="text()" /></td>
<td><font color="blue"><xsl:value-of select="amount"/></font></td></tr>
</xsl:for-each></table></center></p><p><center><table><tr><td><font color="teal" size="5">
Procedure:</font></td></tr><xsl:for-each select="procedure"><tr><td><xsl:value-of select="text()" />
</td></tr></xsl:for-each><tr><td><xsl:for-each select="presentation"><tr><td><xsl:value-of selec="text()" /></td></tr>
</xsl:for-each></table></center></p><p><center><table bgcolor="c0ffff" width="80%">
<xsl:for-each select="originate"><tr><td align="left"><xsl:value-of select="website" /></td>
<td align="right"><xsl:value-of select="date"/></td></tr></xsl:for-each></table></center></p>
</xsl:template>

</xsl:stylesheet>
```

Fig. 3A

```
<!DOCTYPE html PUBLIC "-//W3C//DTD XHTML 1.0 Transitional//EN"
   "http://www.w3.org/TR/xhtml1/DTD/xhtml1-transitional.dtd">
<html xmlns="http://www.w3.org/1999/xhtml">
<head>
<meta http-equiv="Content-Type" content="text/html; charset=windows-1252" />
<meta name="GENERATOR" content="Microsoft FrontPage 4.0" />
<meta name="ProgId" content="FrontPage.Editor.Document" />
<title>Title</title>
</head>
<body>
<center>
<h2><font color="teal">CORN WITH LEMON, ORANGE, AND THYME </font></h2>
</center>                                          ← 401
<center>
<h3><font color="teal">From: John J. Kim</font> </h3>
</center>
<center>
<table cellspacing="12" bgcolor="#ffffc0">
<tbody>
<tr>
<td><img border="0" src="image/recipe.jpg" width="273" height="244"></td>
<td>                      ← 402
<table>
<tbody>
<tr>
<td><font color="teal" size="5">Ingredient:</font></td>
</tr>
<tr>
<td>2 teaspoons peanut oil</td>
</tr>                       ← 403
<tr>
<td>1 small onion, finely chopped</td>
</tr>                       ← 405

<tr>
<td>1 tablespoon finely grated lemon zest</td>
                            ← 406
</tr>
<tr>
<td>1 tablespoon finely grated orange zest</td>
                            ← 407
</tr>
<tr>
<td>1 teaspoon chopped fresh thyme (or 1/2 teaspoon dried)</td>
                            ← 408
</tr>
<tr>
<td>4 cups sweet corn</td>
</tr>
```

FIG. 4A

```
<!DOCTYPE html PUBLIC "-//W3C//DTD XHTML 1.0 Transitional//EN"
   "http://www.w3.org/TR/xhtml1/DTD/xhtml1-transitional.dtd">
<html xmlns="http://www.w3.org/1999/xhtml">
<head>
<meta http-equiv="Content-Type" content="text/html; charset=windows-1252" />
<meta name="GENERATOR" content="Microsoft FrontPage 4.0" />
<meta name="ProgId" content="FrontPage.Editor.Document" />
<title>Title</title>
</head>
<body>
<center>
<h2><font color="teal">{xc_xslt:document/recipe/title/text()}</font></h2>
                                    ◄── 411
</center>
<center>
<h3><font color="teal">From: John J. Kim</font> </h3>
</center>
<center>
<table cellspacing="12" bgcolor="#ffffc0">
<tbody>
<tr>
<td><img border="0" src="{xc_xslt: document/recipe/image/@img}" width="273" height="244"></td>
<td>                                       ◄── 412
<table>
<tbody>
<tr>
<td><font color="teal" size="5">Ingredient:</font></td>
</tr>

<tr>     ◄── 413
<td>{xc_xslt:document/recipe/<xsl:for-each>ingredient/text()</xsl:for-each>}</td>  } 418
</tr>

<tr>
<td>{xc_xslt:document/recipe/<xsl:for-each>ingredient/text()</xsl:for-each>}</td>  } 419
</tr>                                                      ◄── 414

<tr>
<td>{xc_xslt:document/recipe/<xsl:for-each>ingredient/text()</xsl:for-each>}</td>
</tr>                                                      ◄── 415
<tr>
<td>{xc_xslt:document/recipe/<xsl:for-each>ingredient/text()</xsl:for-each>}</td>
</tr>                                                      ◄── 416
<tr>
<td>{xc_xslt:document/recipe/<xsl:for-each>ingredient/text()</xsl:for-each>}</td>
</tr>                                                      ◄── 417
```

```
<?xml version='1.0' encoding='ISO-8859-1' standalone='yes' ?>
<!--Powered by XMLWebGenie 1.0 of XMLCities, Inc.-->
<xsl:stylesheet version="1.0" xmlns:xsl="http://www.w3.org/1999/XSL/Transform">
<xsl:template match="/">
<html>
<head>
<meta content="text/html; charset=windows-1252" http-equiv="Content-Type"/>
<meta name="GENERATOR" content="Microsoft FrontPage 4.0"/>
<meta name="ProgId" content="FrontPage.Editor.Document"/>
<title>Title</title>

</head>
<body>
<center>
<h2><font color="teal"><xsl:value-of
select="document/recipe/title/text()"/></font></h2>
</center>
<center>
<h3><font color="teal">From:</font> John Kim</h3>
</center>
<center>
<table height="263" bgcolor="#ffffc0" cellspacing="12"><tbody><tr>
<td height="249"><img src="{document/recipe/image/@img}" width="281"
border="0" height="249"/></td>

<td height="249">
<div align="left">
<table>
<tbody>
<tr>
<td><font size="5" color="teal">Ingredient:</font></td>
</tr>

<xsl:for-each select="document/recipe/ingredient"><tr>
<td><xsl:value-of select="text()"/></td>
</tr>
</xsl:for-each>
</tbody>
</table>
</div>
</td>
</tr></tbody></table>
</center>
<p> </p>
```

*FIG. 4C*

```
<?xml version='1.0' encoding='ISO-8859-1' ?>
<root>
    <book>                              ← 501
        <name>C++ Programming</name>
        <author>Michael Kim</author>
    </book>        507          ← 502
    <book>
        <name>C++ Programming</name>
        <author>Ivor Horton</author>
    </book>
    <book>                                    500
        <name>C++ Programming</name>
        <author>Michael Kim</author>
    </book>
</root>
```

Fig. 5A

```
<?xml version='1.0' encoding='ISO-8859-1' ?>
<root>
    <book>                              ← 511
        <name>C++ Programming</name>
        <author>Michael Kim</author>
    </book>        516          ← 512
    <book>
        <name>C++ Programming-A1</name>
        <author>Ivor Horton</author>
    </book>
    <book>                              ← 514
        <name>C++ Programming-A2</name>
        <author>Michael Kim-A1</author>
    </book>        517          ← 515
    <book>
        <name>C++ Programming-A3</name>
        <author>John Kim</author>
    </book>
</root>
```

Fig. 5B

```
<?xml version='1.0' encoding='ISO-8859-1' ?>
<root>
    <book>                                  ⟵ 531
        <name>[x]C++ Programming</name>
        <author>[x]Michael Kim</author>
    </book>
    <book>                                  ⟵ 532
        <name>[x]C++ Programming-A1</name>
        <author>[x]Ivor Horton</author>
    </book>
    <book>                                  ⟵ 533
        <name>[x]C++ Programming-A2</name>
        <author>[x]Michael Kim-A3</author>
    </book>
        ⟵535           ⟵ 534
    <book>
        <name>[x]C++ Programming-A3</name>
        <author>[x]John Kim</author>
    </book>
</root>
```

CORN WITH LEMON, ORANGE, AND THYME

From: John Kim

Ingredient:
- 2 teaspoons peanut oil
- 1 small onion, finely chopped
- 1 tablespoon finely grated lemon zest
- 1 tablespoon finely grated orange zest
- 1 teaspoon chopped fresh thyme (or ½ Teaspoon dried)
- 4 cups sweet corn
- 2 tablespoons water
- Salt and pepper to taste

Procedure:
Arrange one eighth of the topping on each crust, and scatter a little shredded cheese over topping.
Cover grill and cook for 3 to 4 minutes pizzas to prevent burning, until cheese is melted and Underside of crust golden brown.

Presentation:
The fresh citrus flavor of lemon and orange and the savory flavor of thyme pair wonder-fully with the sweetness of corn.

*Fig. 8C*

EXTENSIBLE STYLESHEET DESIGNS IN VISUAL GRAPHIC ENVIRONMENTS

CROSS-REFERENCE TO RELATED APPLICATION

This application claims the benefits of the following U.S. provisional applications: U.S. Provisional Application No. 60/343,117, filed Dec. 21, 2001, and entitled "Method and Apparatus for Extensible Markup Language Conversion and Extensible Stylesheet Design Using Differentiated Associated Meta-Tag Information"; U.S. Provisional Application No. 60/349,924, filed Jan. 17, 2002, entitled "Method and Apparatus for Manipulating Meta-tag Information using Document Object Path Information"; and U.S. Provisional Application No. 60/349,957, filed Jan. 17, 2002, entitled "Extensible Markup Language Conversion and Stylesheet Design Using Meta-Tag Information and/or Associated Meta-Tag Information", all of which are hereby incorporated by reference for all purposes. This application is also related to co-pending U.S. patent application Ser. No. 09/754,969, entitled "Method and apparatus for utilizing document type definition to generate structured documents" which is hereby incorporated by reference.

BACKGROUND OF THE INVENTION

1. Field of the Invention

The present invention generally relates to the area of document processing and electronic publishing system, and more particularly, relates to techniques for designing extensible style sheets using meta-tag information and/or differentiated associated meta-tag information, where the designed extensible style sheets are for various presentations and information exchange.

2. Description of the Related Art

The Internet is a rapidly growing communication network of interconnected computers around the world. Together, these millions of connected computers form a vast repository of hyperlinked information that is readily accessible by any of the connected computers from anywhere and anytime. With millions of web pages being created and added to this vast repository each day or year, there is a tremendous need to quickly and easily convert documents, such as presentations, data sheets or brochures, into a format presentable to and accessible by other applications or devices on the Internet.

It is well known that a preferable format that is presentable to a web browsing application (e.g. a browser) is in a markup language, such as Hypertext Markup Language (HTML), Extensible Markup Language (XML), Standard Generalized Markup Language (SGML) or Wireless Markup Language (WML). Files or documents that are so composed, edited or managed for web browsing applications are commonly referred to as structured files or documents. Among the structured documents, a content-oriented structured document like XML or SGML is capable of supporting any markup tags from document type definitions (DTD) or schema while a presentation document in HTML or WML can only support a fixed set of markup tags.

The demand for dynamically converting the content-oriented structured documents with proper style transformation for a particular request medium opens a new paradigm for information exchange and storage. For example, contents in a website are stored in XML formats. If a web browser (e.g., Netscape or IE) in a desktop computer requests information form the website, the website is preferably to convert the contents in XML into converted contents in HTML and subsequently sends the converted files back to the browser. If a portable device (e.g. a PDA or internet-enabled cell phone) requests information by a micro-browser from the same website, the website is preferably to convert the contents in XML into converted contents in WML and send the converted files back to the micro-browser. Furthermore, the website can also convert the internal XML into another type of XML so as to exchange information between websites.

Dynamically converting the content-oriented structured documents into desired presentation requires what is called a style sheet, a term extended from print publishing to online media. A style sheet is a definition of a document's appearance in terms of such elements as: a default typeface, size, and color for headings and body text, how front matter (preface, figure list, title page, and so forth) should look and how all or individual sections should be laid out in terms of space.

One of the methods of creating a style sheet for an XML file to an HTML file involves matching the data or attributes of HTML elements with the associated meta-tag information in the XML file, e.g., data or attributes of XML elements. A user can create a new source HTML file by inserting the associated meta-tag information of the source XML file as the data or attributes of the elements of the source HTML file. Then the user can manipulate/add/subtract the HTML tag or tags around the associated meta-tag information of the source XML file in the source HTML file for customizing the HTML tags using WYSISWYG HTML editors such as Microsoft FrontPage, macromedia Dreamweaver, or Adobe goLive so that the customized HTML tags comprises the desired outcome of the target XSL file.

Once desired customized HTML tags are made around the inserted associated meta-tag information of the XML file in the HTML file, a software process can use a matching algorithm to identify the particular XML data or attributes by matching the associated meta-tag information of the HTML elements. By identifying the particular XML data or attributes, the software process may automatically generate meta-tag information that hold the information about the relationships of the XML data or attributes in respect to its parent elements, its sibling elements, and its relationship with the root element. The location of the associated meta-tag information and its relationship with HTML tags may also be used to insert the corresponding meta-tag information at a matched location in the source HTML file in respect to its relations to the customized HTML tags. The combination of the meta-tag information with the customized HTML tags can then be used to generate the style sheet or a target XSL file.

However, this process can be problematic if an XML file contains elements with the same associated meta-tag information. FIG. 1A shows an example that has two identical elements 10, and 14. A software process that relies on matching the associated meta-tag information would not be able to differentiate as to whether the correct associated meta-tag information is from 10 or from 14 of FIG. 1A.

Today, most websites are written in HTML, and there is a growing need for converting the HTML files into XML files and extensible style sheet language for transformation (XSLT) files to fully utilize the benefit of the XML has to offer. A similar problem may be experienced when an HTML file is converted to an XML file. FIG. 1B shows an HTML file. If a user wishes to convert a data portion 16 as <xsl:value of select="root/book/author/text( )"/>, then a software process would not be able to differentiate which one of the data portions 14 or 16 of the HTML file should be modified with meta-tag information since both data portions 14 or 16 are identical.

There is therefore a need for solutions that can uniquely identify all the associated meta-tag information in a markup language file (e.g., an XML file).

Since the introduction of the XML, XSLT (Extensible Stylesheet Language Transformation) has been proposed as a separate subset of XML for displaying via HTML the content of an XML file into various media such as web-browsers, hand-held devices, and wireless phones. One of the methods of creating an extensible style sheet for an XML document involves matching data or attributes of an HTML document with the associated meta-tag information, i.e. data or attributes of the XML document. Thus, a new source HTML document can be created by inserting the associated meta-tag information of the source XML document as the data or attributes of the source HTML document. Then the user can manipulate/add/subtract the HTML tags around the associated meta-tag information of the source XML document in the source HTML document for customizing the HTML tags using WYSISWYG HTML editors such as Microsoft FrontPage, macromedia Dreamweaver, or Adobe goLive so that the customized HTML tags comprises the desired looks and feels of the target XSLT for the given XML document.

Once desired customized HTML tags are made around the inserted associated meta-tag information of the XML document as an HTML document, a software process can use a matching algorithm so that the matched associated meta-tag information of the HTML elements can be used to identify the corresponding XML data or attributes. By identifying the particular XML data or attributes, the software process can automatically generate meta-tag information that hold the information about the relation of the XML data or attributes with respect to its parent elements, its sibling elements, or its relationship with the root element. The location of the matching associated meta-tag information and its relationship with HTML tags can also be used to insert the corresponding meta-tag information at the matched location in the source HTML document with respect to its relations to the customized HTML tags. The combination of the meta-tag information with the customized HTML tags can then be used to generate the target XSL file.

However, this process can be problematic if the meta-tag information contains only the information about the relationship of the XML data and attributes from the elements. An XSLT contains rich sets of functionalities such as <xsl:for-each/> that can't be described without any information from user's requirements for functionalities. Thus, there is another need for creating an XSLT that reflects uers required operations and functionalities.

To accommodate the growing need for converting the HTML files into XML files and extensible style sheet language for transformation (XSLT) files to fully utilize the benefit of the XML has to offer, there is still another need to streamline the conversion process from one markup language file (e.g. HTML) to another markup language file (e.g. XML).

SUMMARY OF THE INVENTION

This section as well as the abstract is for the purpose of summarizing some aspects of the present invention and to briefly introduce some features or preferred embodiments. Simplifications or omissions may be made to avoid obscuring the purpose of the section or the abstract. Such simplifications or omissions are not intended to limit the scope of the present invention.

The present invention pertains to the use of meta-tag and/or associated meta-tag information to design extensible stylesheets (XSL) for transferring a source XML file into a target file. According to one aspect of the present invention, to generate a proper stylesheet (e.g., an XSL or XSLT file) from a source file (e.g., an XML file), all meta-tag and/or associated meta-tag Information are differentiated by attaching respectively unique identifiers to those that are otherwise identical. To facilitate user required operations on certain data in the source file, a document source path for the data is identified and inserted with one or more operators thus to form document source path information. The differentiated meta-tag and/or associated meta-tag Information and source path information are relied upon to generate one or more stylesheets.

According to another aspect of the present invention, a graphic user interface environment is provided to allow a user to visually manipulate or operate the meta-tag and/or associated meta-tag information. The graphic user interface environment including at least two displays is provided. One of the displays is from a commonly used browser or an application to display a target file including a plurality of objects and the other display is used to facilitate the editing of a tree structure. Each of the nodes in the tree structure is associated with one of the objects by associated meta-tag information. Based on the tree structure, a source can be generated. Together with the source file, the stylesheet can be designed in accordance with the displayed target file.

According to one embodiment, when a target file is displayed (e.g., in a browser or authoring tool), the output presentation includes a number of objects, such as a picture or a sentence or a group of words. Some of the objects are dynamic in a sense that these objects are respectively linked with source elements or objects in the source file so that any changes to the source objects will be dynamically reflected in the target file. Each of the meta-tags inserted into a tree structure specifies a relationship to the corresponding source object in the source file. As one of the features in the present invention, unique ways to place the meta-tags are provided depending on implementation and application.

Once the meta-tags are created for the target file, a converting module generates a resultant XSL file in reference to the target file. The converting module is configured to search for the meta-tags and subsequently generates the XSL for the target file. To ensure that all the meta-tag and/or associated meta-tag information can be treated accordingly, a differentiating process is configured to differentiate those meta-tag or associated meta-tag information by attaching respective unique identifiers.

The present invention may be implemented as a method, a system, a software product or other forms. One of the objects, benefits and advantages in the present invention is to provide generic and easy-to-use solutions for designing stylesheets.

Objects, benefits and advantage together with the foregoing are attained in the exercise of the invention in the following description and resulting in the embodiments illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 1A shows an example that has two identical elements that can cause problems when being converted to a stylesheet;

FIG. 1B shows that an HTML file has two identical elements that can cause problems when a stylesheet is generated in accordance with the HTML file;

FIG. 2A is an example of document type definitions (DTD) for recipe-type documents;

FIG. 2B shows an extensible markup language (XML) file based on the document type definitions (DTD) in FIG. 2A;

FIG. 3A shows an extensible stylesheet language (XSL) file, which transfers the XML file in FIG. 2B into an HTML file;

FIG. 4A shows an HTML file having contents that can be used as respective associated meta-tag information;

FIG. 4B shows an XML file that contains or can be used to show the information about its meta-tag information;

FIG. 4C shows a resultant XSL file in accordance with FIG. 4A and FIG. 4B;

FIG. 5A shows an XML file with </root> as a root element and includes two identical data, each is respective associated meta-tag information;

FIG. 5B shows that an element having data "C++ Programming" used as a reference and another element is now attached with an identifier "-A1" such that the modified element becomes as "C++ Programming-A1";

FIG. 5C shows an example that can be displayed in a dialog box to show that there are two elements with identical content (e.g., data or attributes);

FIG. 7A–FIG. 7D show, respectively, progresses of inserting user required operations on desire data and resultant XSL files;

FIG. 8A–FIG. 8C show, respectively, progresses of generating an XML tree in accordance of a DTD pool or file (not shown), editing of the XML tree and associated meta-tag information;

DETAILED DESCRIPTION OF THE PREFERRED EMBODIMENTS

In the following description, numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1–9E, in which like numerals refer to like parts throughout the several views. However, those skilled in the art will readily appreciate that the detailed description given herein with respect to these figures is for explanatory purposes as the invention extends beyond these limited embodiments.

Figure 1C:
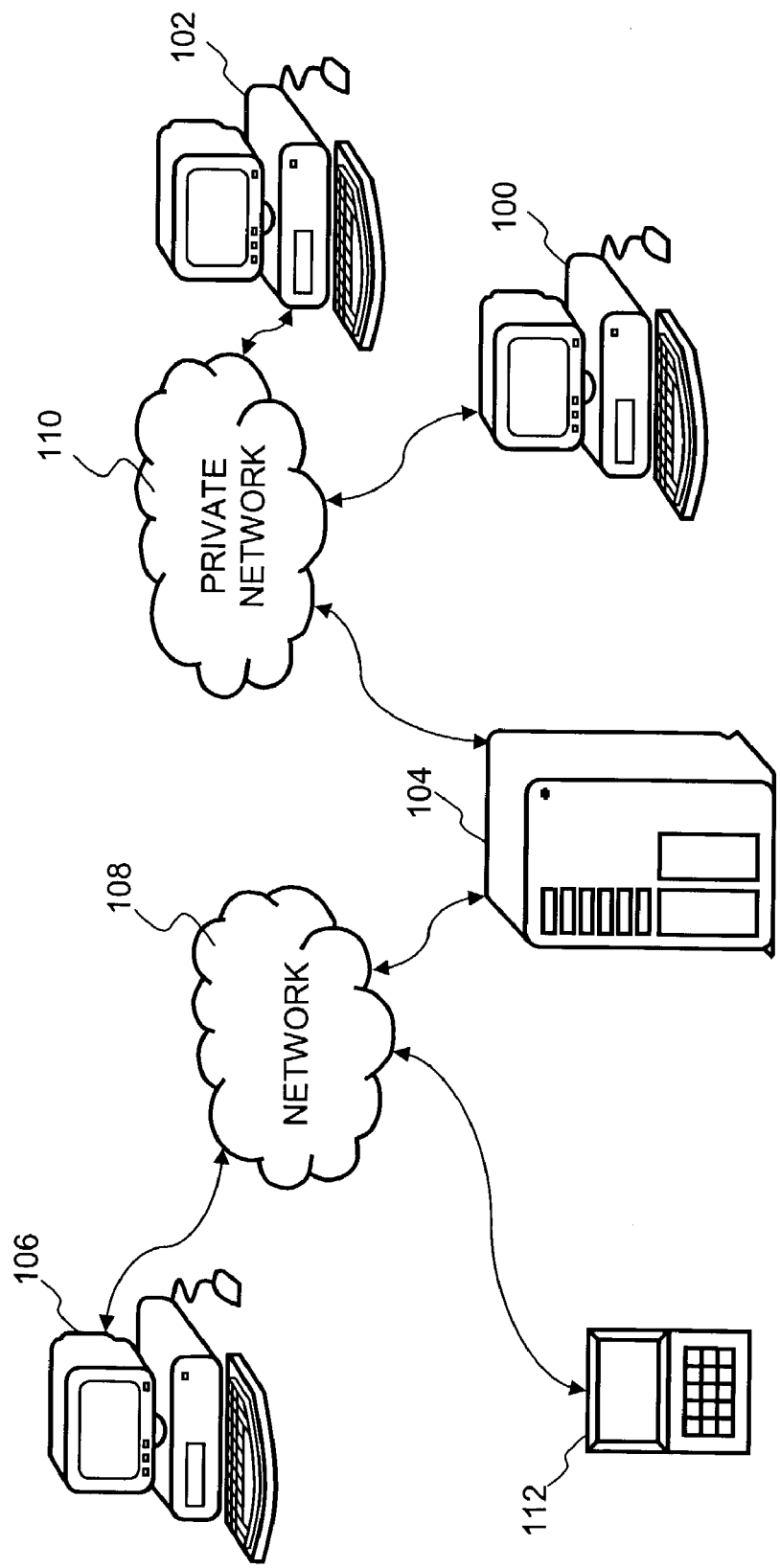
FIG. 1C shows a basic system configuration in which the present invention may be implemented in accordance with a preferred embodiment.

FIG. 1C shows a basic system configuration in which the present invention may be implemented in accordance with a preferred embodiment. Content-oriented documents containing information, such as product descriptions, functions lists and price schedules, may be created using an authoring tool executed on a computer 100. These documents may be in XML (Extensible Markup Language) which is being promoted to be used to create common information formats and share both the format and the data on the World Wide Web, intranets, and elsewhere. XML is "extensible" because, unlike HTML, the markup symbols are unlimited and self-defining.

The extensible stylesheets (or XSL) to transfer these documents into various presentations may be created in a computing device 102, which may be a server station or a desktop computer loaded with an executable version of one embodiment implementing the present invention.

In one setting, computer 100 and computing device 102 are inseparable and perform document conversion process that ultimately represents contents in a format of markup language such as WML or HTML. In one application, the content-oriented documents represented in XML and transformations in XSL become available through a private network 110 to a service server 104 that hosts what is generally referred to as a www (world wide web) site.

In one situation, a user uses a desk computer 106 that operates a browsing application and is coupled to data network 108 to access files on service server 104. These requested XML files will be converted into HTML files by proper XSL files and be sent back to the desktop computer. In another situation, a user uses a PDA 112 that operates a WAP browsing application and is coupled to data network 108 (perhaps via a wireless network) to access files on service server 104. These requested XML files will be converted into WML files by the proper XSL files and be sent back to the PDA 112 provided that PDA 112 is WAP-compliant.

As will be explained below, the present invention is not limited to the Internet applications. It may be practiced in individual computers in which users often create the XSL files to convert the XML files into the HTML or WML files off-line. Since the contents and presentations are separated, users can easily create another set of XSL files for different look and feel.

According to one embodiment, a content-oriented document such as XML starts with document type definitions (DTD) or schema to define document elements. FIG. 2A illustrates an example of DTD 200 for "recipe-type" documents, in which a document is to be broken down into structures of document elements. A particular document element 202 may contain other document elements and attributes. Another example of the document element 204 contains only the parsed character data. FIG. 2B shows an example of an XML file, where information is represented in parsed data elements defined in document type definitions (DTD) as given in FIG. 2A.

An XML file can be transferred into various presentations using extensible stylesheets (XSL). An example of an XSL file which converts the XML file 206 into an HTML file is given in FIG. 3A. In particular, block 302 shows that the top level <html> tag is created when the XSL file matches the tag "document" and block 304 shows how to assign the value from the source XML file to the target HTML file. A corresponding screenshot of the resulted HTML from a browser application (e.g. Microsoft Internet Explorer) is given in FIG. 3B.

Figure 3B:
FIG. 3B shows a screenshot of the transferred HTML file of FIG. 3A.
Figure 3C:
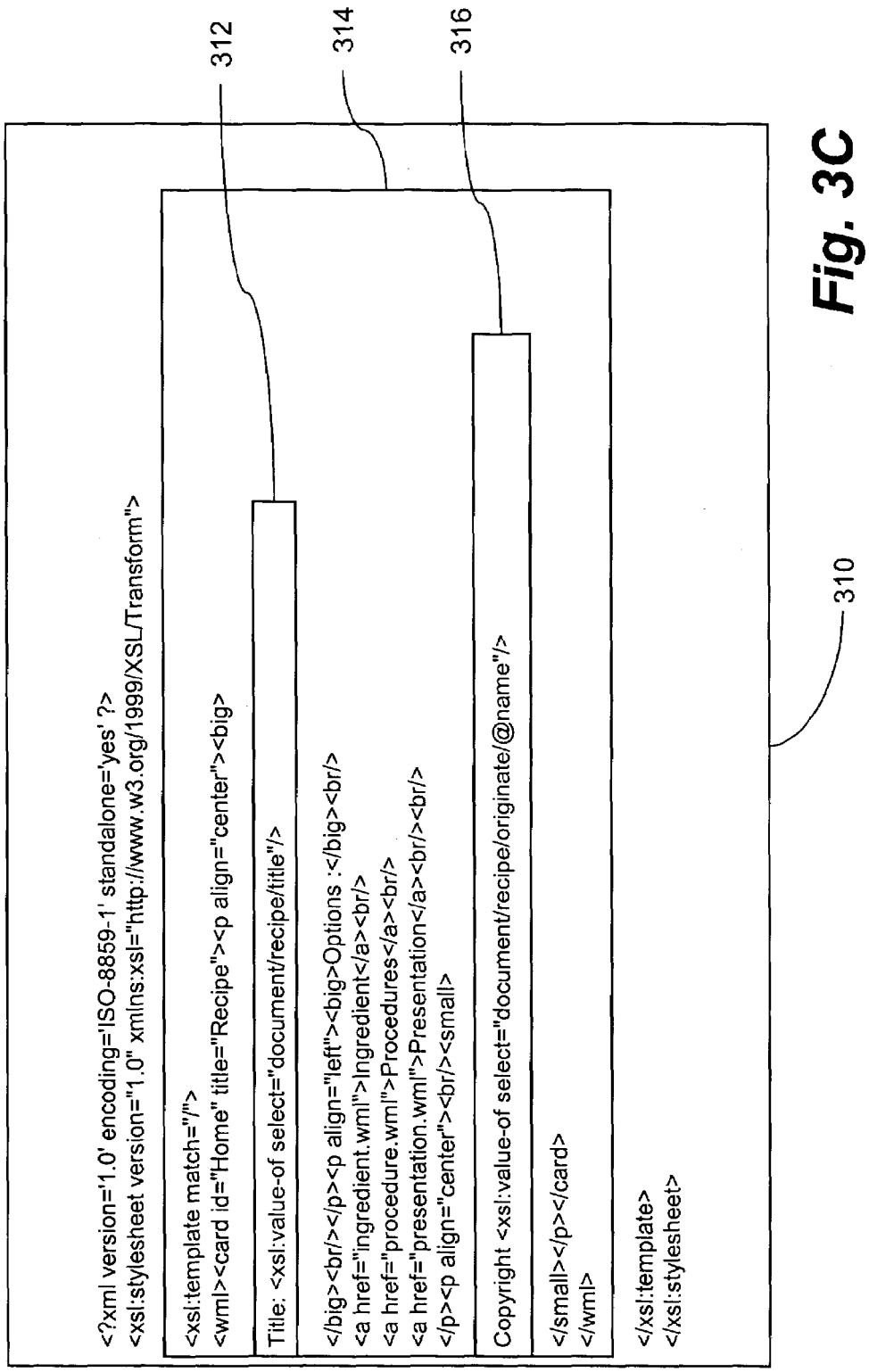
FIG. 3C shows an XSL file, which transfers the XML file in FIG. 2B into a WML file.

Another example of an XSL file which converts the XML file 206 into a WML file is given in FIG. 3C. In particular, block 314 shows that the top level <wml> tag is created when the XSL file matches the root element, block 312 shows how to assign the "title" value from the source XML file to the target WML file, and block 316 shows how to assign the "name" attribute of the "originate" element from the source XML file to the target WML file.

Figure 3D:
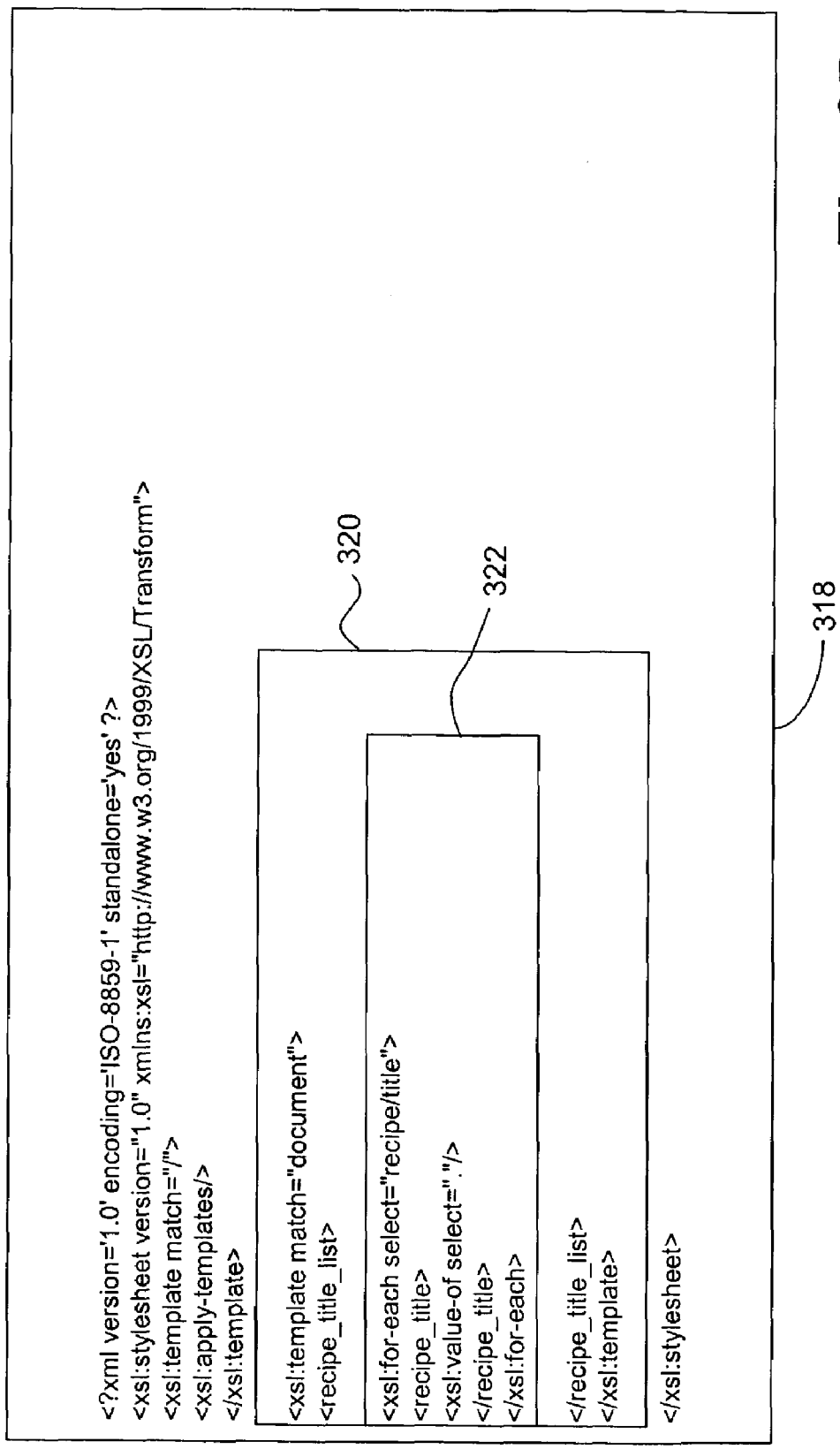
FIG. 3D shows an XSL file, which transfers the XML file in FIG. 2B into another XML file.

Other than transferring an XML file into various presentations, an XSL file can also transfer an XML file into another XML file with different DTD or schema. The primary reason for this type of transformation is for information exchange between different systems. FIG. 3D shows an example of an XSL file, which converts the XML file 206 into another XML file of a list of the recipe titles. In particular, block 320 shows that the top level <recipe_title_list> tag is created when the XSL file matches the "document" element and block 322 shows how to assign each of the "title" values in the source XML file to the <recipe_title> tag in the target XML file.

From the above XSL examples, one can see that an XSL file is a combination of a target file (e.g. in HTML, WML, or XML) and <xsl:> tags to associate the information from the source XML file and/or through the source XML's DTD or schema file. One aspect of the present invention pertains to techniques for designing XSL files. According to one embodiment, an authoring tool is employed. The authoring tool may be FrontPage for HTML, Intava Gravity Professional for WML, and XMLeditor for XML. With one of these WYSIWYG authoring tools, a user can design the look-and-feel of a target file or an output presentation with an XML editor and a user can design a target XML tree showing the hierarchical relationships among the source objects (e.g. document elements), which is described in detail in co-pending U.S. patent application Ser. No. 09/754,969. Then, the user can insert meta-tag information that specifies the corresponding source information, right in the authoring tools for the target file. The target file with meta-tag information will be loaded into an XSL converting module that automatically generates the resultant XSL files in reference to the target file or presentations.

As used herein, meta-tag information means information or a piece of data from an XML document that contains information about its association with a particular element, data, or attribute in the XML document, and the relation of its elements, data, and attributes in regards to other element, data, and attributes of the XML document. For example, meta-tag information for a data node is {xc_xslt: document/recipe/title/text( )} in FIG. 4B, where "document/recipe/title/text( )" shows the location of the data node and the relation of its parent node, i.e. the "title" node with other elements of the XML document.

Similarly, as used herein, associated meta-tag information means information or a piece of data from a source file, such as "CORN WITH LEMON, ORANGE, AND THYME" in the HTML file of FIG. 4A, that can be used to associate meta-tag information of an XML document such as the meta-tag information {xc_xslt: document/recipe/title/text( )} in FIG. 4B. And the meta tag information will be converted into an XSLT element such as <xsl:value-of select="document/recipe/title/text( )"/> 432 in FIG. 4C.

FIG. 5A shows an XML file 500 with </root> as a root element and includes two identical data, each is respective associated meta-tag information 501 or 502. According to one embodiment of the present invention, when a source XML file is received, the first associated meta-tag information (e.g., 501) of the XML file is identified, as a reference, to compare with the rest of the XML file. If there are any elements with the data or attributes that are identical to that of the reference, then unique identifiers or identifiable characters, such as numeric characters, are attached to the matched elements (or its data or attribute).

FIG. 5B shows that element 511 having data "C++ Programming" is used as a reference. The element 512, identical to the element 511, is now attached with an identifier "-A1" such that the modified element 512 becomes as "C++ Programming-A1". With the unique and identifiable characters attached in the element 512, the elements 511 and 512 can be uniquely differentiated and identifiable from each other.

If more identical elements with identical data or attributes are found in the rest of the XML file, then identifiers are respectively added to the matched data or attribute of the identified elements. FIG. 5B further shows that the elements 514 and 515 with attached characters (i.e., identifier) "-A2", and "-A3". If the searching could not find the next identical data or attribute from the rest of the XML file, then a second reference is identified, such as the referenced element 516, to compare with the rest of data or attributes of the XML elements. If the element 516 is one of the data or attributes that are identical to the previously referenced element, then the element will be skipped. If the rest of the data or attributes of the XML elements contains the identical data or attributes of the second reference 516, then a different kind of identifier is used or the used identifier is reset. FIG. 5B shows the element 517 has been attached with a unique (reset) identifier "-A1" that can differentiate and unique identify the elements 517 from 516.

According to another implementation, when the rest of the data or attributes of the XML file contains the same data or attributes, a dialog box (window) is provided to display the elements with the same data or attributes as the reference. FIG. 5C shows an example that can be displayed in a dialog box to show that there are two elements 531 and 535 with identical content (e.g., data or attributes). Thus, a user is given an opportunity to either change the data or attribute of the element 531 and the element 532 of FIG. 5C or to make both of the elements differentiated, individually unique, and identifiable from each other or from the corresponding identical elements. Once the user changes either one or both of the elements, either element 501 or 502 will be used as reference and facilitate to look for the rest of the data or attributes of the elements in the XML file for comparison. FIG. 5C shows that all the identical elements have been differentiated and uniquely labeled. If no same data or attributes are found, then the next most data or attributes of the element of the XML file that has not been referenced or identified with previous reference will be used as reference until the same data or attributes of the rest of the XML file is found.

In one implementation, an identification tag is inserted into a portion of or every data and attributes of the XML file, such as "[x]Michael KIM" as in the elements of FIG. 5C. In converting the processed XML file to an HTML file, only the elements with "[x]" will be interpreted as associated meta-tag information and processed by the style-sheet converter for converting the associated meta-tag information with meta-tag information that will then be modified with <xsl: /> elements.

Figures 6A, 8D:
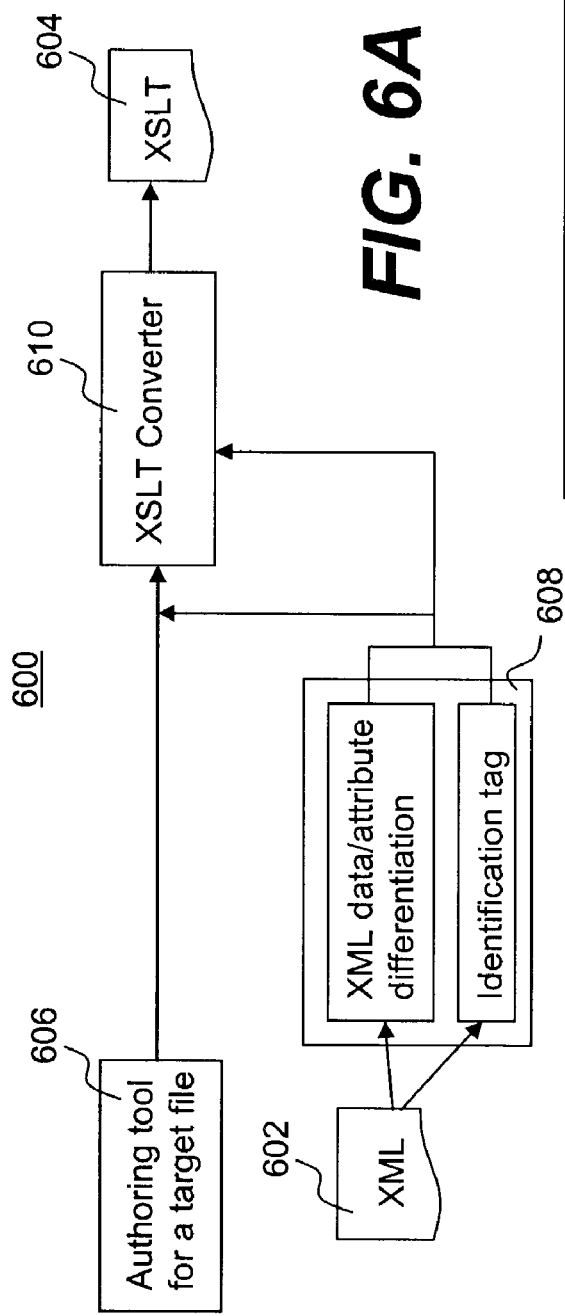
FIG. 6A shows a block diagram of converting an XML file to an XSLT file in accordance with the present invention.
FIG. 8D shows an example of HTML document that contains an element with broken XML text data and shows an element <p/> that contains the text data "C++ Programming" that is further broken into two separate text data "C++" and "Programming"

FIG. 6A illustrates a block diagram 600 of converting an XML file 602 to an XSLT file 604 in accordance with the present invention. Different from the prior art, when the XML 602 is received, a tag differentiating process 608 is added such that the associated meta-tag information in the XML file 602 is respectively differentiated and identification tags may be respectively attached to the XML data and attributes. In general, the target file 604 with associated meta-tag information can be created by an authoring tool 606 and converted into one or more XSL files through a converter 610.

Figure 6B:
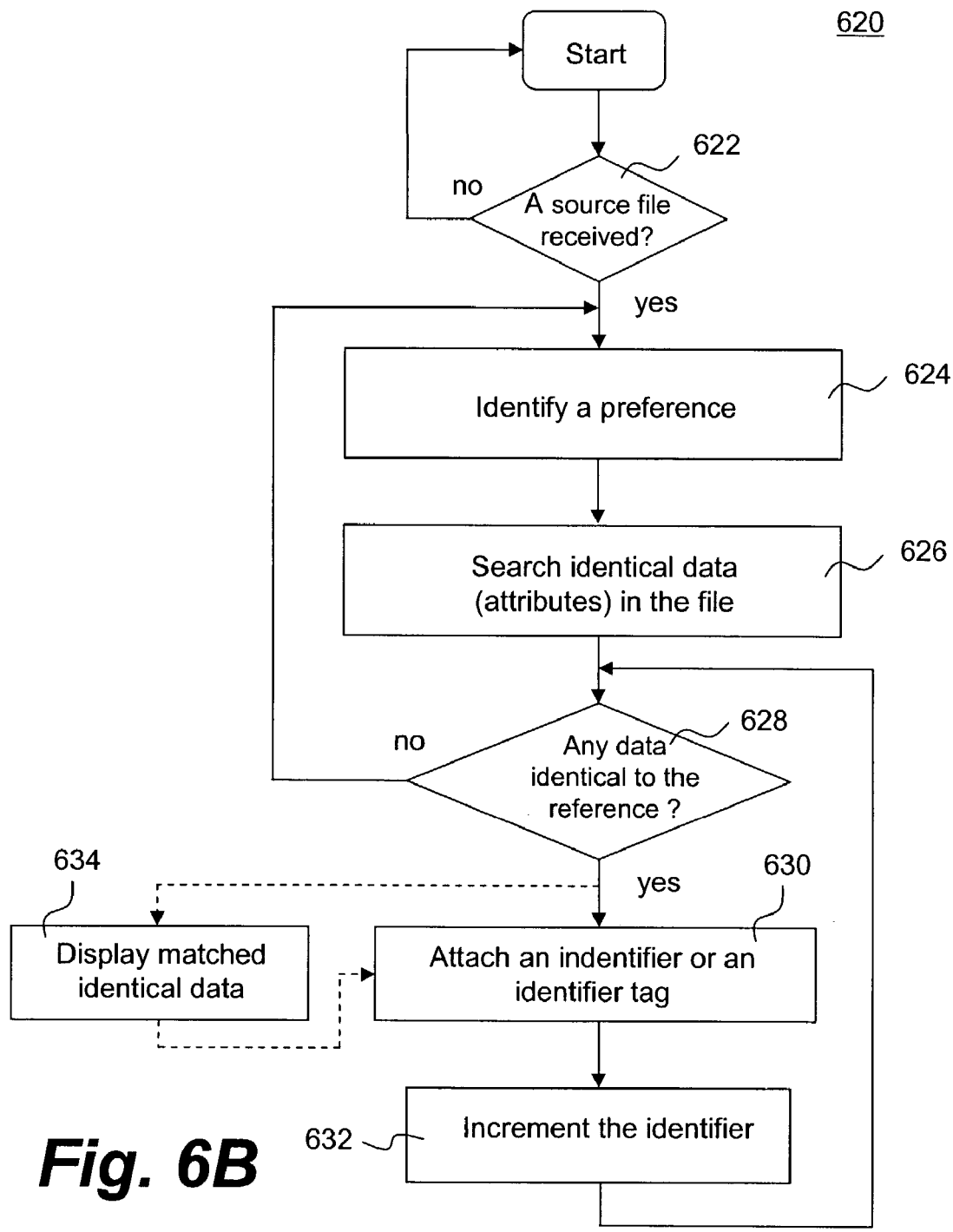
FIG. 6B shows a corresponding flowchart or process in accordance with the block diagram in FIG. 6A.

FIG. 6B shows a corresponding flowchart or process 620 in accordance with the block diagram 600 of FIG. 6A. At 622, the process 620 awaits a source file that is typically a markup language file (e.g., an XML file). Upon receiving the file, an element in the source file is identified as a reference at 624. A search or matching processing takes place at 626 to identify any elements identical to the reference. At 628, an element is located to be identical to the reference, then an identifier is attached to the located element at 630. To differentiate the resultant identifiers, at 632, the identifier is incremented, for example, from A1 to A2, or XA to XB. The process 620 goes back to 628 to search any other identical elements till no more elements identical to the reference can be located. The process 620 then goes to 624 to identify another non-labeled element as a reference to continue the process 620 till all identical elements in the source file are differentiated or respectively labeled.

Optionally, when an identical element is located at 628, a dialog box is provided at 634 for the user, if desired, to alter the data or attributes of the identical element to be different from the reference. Further an identifier tag is inserted into the differentiated element at 630 to facilitate the subsequent conversation fro the source to another marked-up language file (e.g., an HTML file).

It should be noted that, depending on implementation, the process 620 may be implemented in parallel. That means that a number of elements may be identified at 624 as respective references. Thus the process 620 does not have to go through loops before all elements are differentiated and/or tagged respectively with identifier tags.

From the above description, meta-tag information for a data node includes source information and a document object path (DOP), for example, the meta-tag information {xc_xslt: document/recipe/title} includes "document/recipe/title" being the DOP and "xc_xslt:" being the source information. The DOP of meta-tag information shows the location of the data node and the relation of its parent node, e.g., a "title" node with other elements of the XML document in reference to FIG. 7A. The DOP uniquely identifies the "title" element while "xc_xslt:" shows information about its target file, namely, an xsl file.

Document object path information (DOPI), as used herein, means any language that specifies the location of a particular element or elements, attributes, and text data and the associated user defined operation or process for the subset of DOP. The DOPI is defined to differentiate itself from XPath (a language for addressing parts of an XML document) such that further information regarding the user specified requirement on manipulating meta-tag information can be inserted and processed into the DOP that identifies a particular element or elements, attributes, and text data of document object.

An example of DOPI for an XML document without any user specified operation or process requirement on a subset of DOP is "document/recipe/title" of the meta-tag information {xc_xslt:document/recipe/title}. The subset document/recipe/title in the meta-tag information shows that a title element is located as a child of a recipe and the recipe is a child of a document, and the document is a root element of the XML document. An example of DOPI for an XML document with user specified operation or process requirement (i.e., desired operation) on a subset of DOPI is {xc_xslt:document/recipe/<xsl:for-each>ingredient/text(  )<xsl:for-each/>} for the subset "document/recipe/title", wherein "document/recipe/<xsl:for-each>ingredient<xsl:for-each/>" shows that an operator or tag <xsl:for-each> is inserted between "recipe/" and "ingredient" and the end-tag of <xsl:for-each/> is inserted after "ingredient". Here, <xsl:for-each/> shows that user requires an operation of <xsl:for-each/> on the XSLT for the text data of the ingredient elements that has recipe as the parent element and document as the root element.

A user can insert more than one user desired operation on a subset of a DOPI. For example, a user could insert document/recipe/<xsl:template><xsl:for-each>ingredient/text(  )<xsl:for-each/><xsl:temlplate/> as DOPI. In this example, the user requires both <xsl:template/> and <xsl:for-each/> operation on the text data of the "ingredient" element of "document/recipe/ingredient/text(  ). document/ recipe/<xsl:template/>ingredient[1]/text( )<xsl:template/>", which means that the user wants <xsl:template/> operation on the text data of the first "ingredient" child element of the recipe parent element with document as the root element.

According to one embodiment, upon receiving an XML file as a source document, the file is loaded into an XML parser such as XercesC++ from www.apache.org. Within the Xercers-C++, the source document is parsed as elements, attributes, and data in a tree-like structure that can be individually accessible via Xercers-C++ API. Within the XML parser, a user can select text data and attributes of the source XML document as associated meta-tag information and create meta-tag information for each associated meta-tag information with DOPI.

Figure 7A:
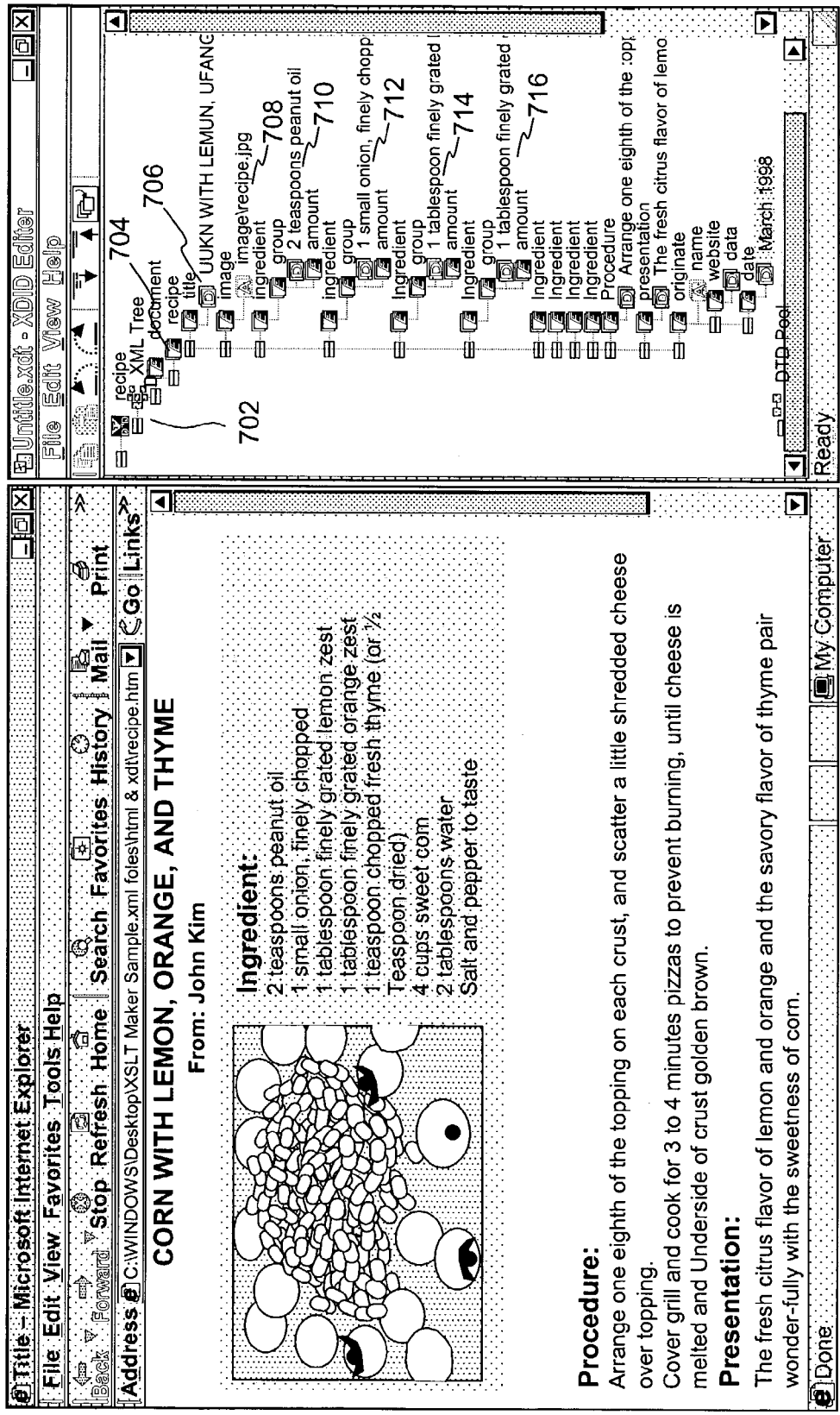

FIG. 7A shows the content of a XML document 700 displayed in a tree like structure 702 via a software implementation of one embodiment of invention. The XML document is parsed via a XML parser and elements 704, data 706, and attributes 708 are displayed as separate nodes. Given a visualization of the XML document parsed in the XML parser, a user can select or create associated meta-tag information. Once the data and attributes are selected as associated meta-tag information, the Document Object Path can be created, for example, the data 704, its Document Object Path is "Document/Recipe/Title/text( )" where "Title" is the parent element of the data 704, "Recipe" is a parent element of "Title", and Document is the root element that is the parent of "Recipe" element. For the attribute 708, the Document Object Path is "Document/Recipe/image/text( )", and for the data 710, 712, 714, and 716, the DOP are, "Document/Recipe/ingredient[1]/text( )", "Document/Recipe/ingredient[2]/text( )", "Document/Recipe/ingredient[3]/text( )", and "Document/Recipe/ingredient[4]/text( )" respectively. It is noted that for data 710, 712, 714, and 716, the names of their parent elements are the same. Therefore, "[]" with identifier numbers are inserted, according to the above description, after the name of the parent element so as to differentiate the nodes or meta-tag information 710, 712, 714, and 716.

Before or after the creation of the DOP, it allows users to input user required operations for the desired stylesheet action such as <xsl:for-each/> and <xsl:template/> on the element nodes. <xsl:for-each/> is an XSLT instruction that selects a set of nodes using an Xpath expression, and performs the same processing for each node in the set, and <xsl:template/> is an XSLT instruction that defines a template for producing an output by matching nodes against a pattern or by name. A user may put special characters in front of the name of the elements, highlight the element node, or select predefined functionalities available for the given implementation of the invention via dialogue. The user may select any elements nodes, data, attributes and provide certain information on how to process the elements.

Figure 7B:
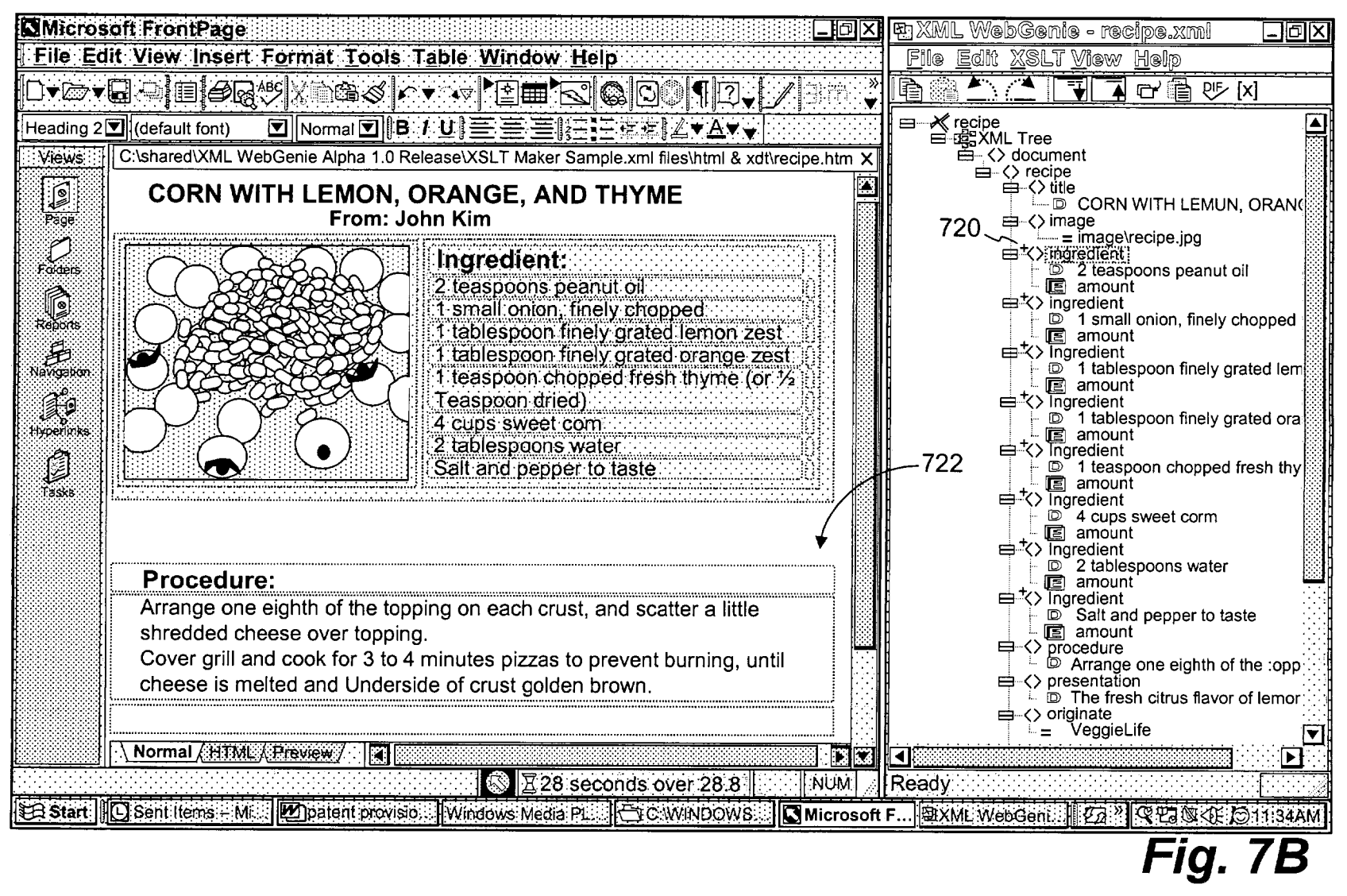

If there is a "+" sign in front of the ingredient element symbols as referenced by 720 in FIG. 7B, the present invention facilitates to create a DOPI, where the DOP of 710, 712, 714, and 716 of FIG. 7A will be changed to "Document/Recipe/<xsl:for-each>ingredient/text( )</xsl:for-each>", "Document/Recipe/<xsl:for-each>ingredient/text( )</xsl:for-each>", "Document/Recipe/<xsl:for-each>ingredient/text( )</xsl:for-each>", and "Document/Recipe/<xsl:for-each>ingredient/text( )</xsl:for-each>" respectively. The <xsl:for-each> and </xsl:for-each> shows that the user wants every ingredient node that is located between <xsl:for-each> and </xsl:for-each> to be selected and process the same way independent of the number of ingredient nodes under "Document/Recipe" parents.

If there is a "D" sign in front of the ingredient element symbols, facilitates to create a DOPI, where DOP of 710, 712, 714, and 716 of FIG. 7A will be changed to "Document/Recipe/<xsl:template>ingredient/text( )</xsl:template>", "Document/Recipe/<xsl:template>ingredient/text( )</xsl:template>", "Document/Recipe/<xsl:template>ingredient/text( )</xsl:template>", and "Document/Recipe/<xsl:template>ingredient/text( )</xsl:template>" respectively.

Further, user may specify more than one instruction on the same element or elements such that the DOPI can be "Document/Recipe/<xsl:template><xsl:for-each>ingredient/text( )</xsl:for-each></xsl:template> and "Document/<xsl:template> Recipe/<xsl:template><xsl:for-each>ingredient/text( )</xsl:for-each></xsl:template>. Once DOPIs are constructed, a user may insert the associated meta-tag information into an WYSISWYG editor to create a target file from the stylesheet 722 of FIG. 7B.

Figure 7C:
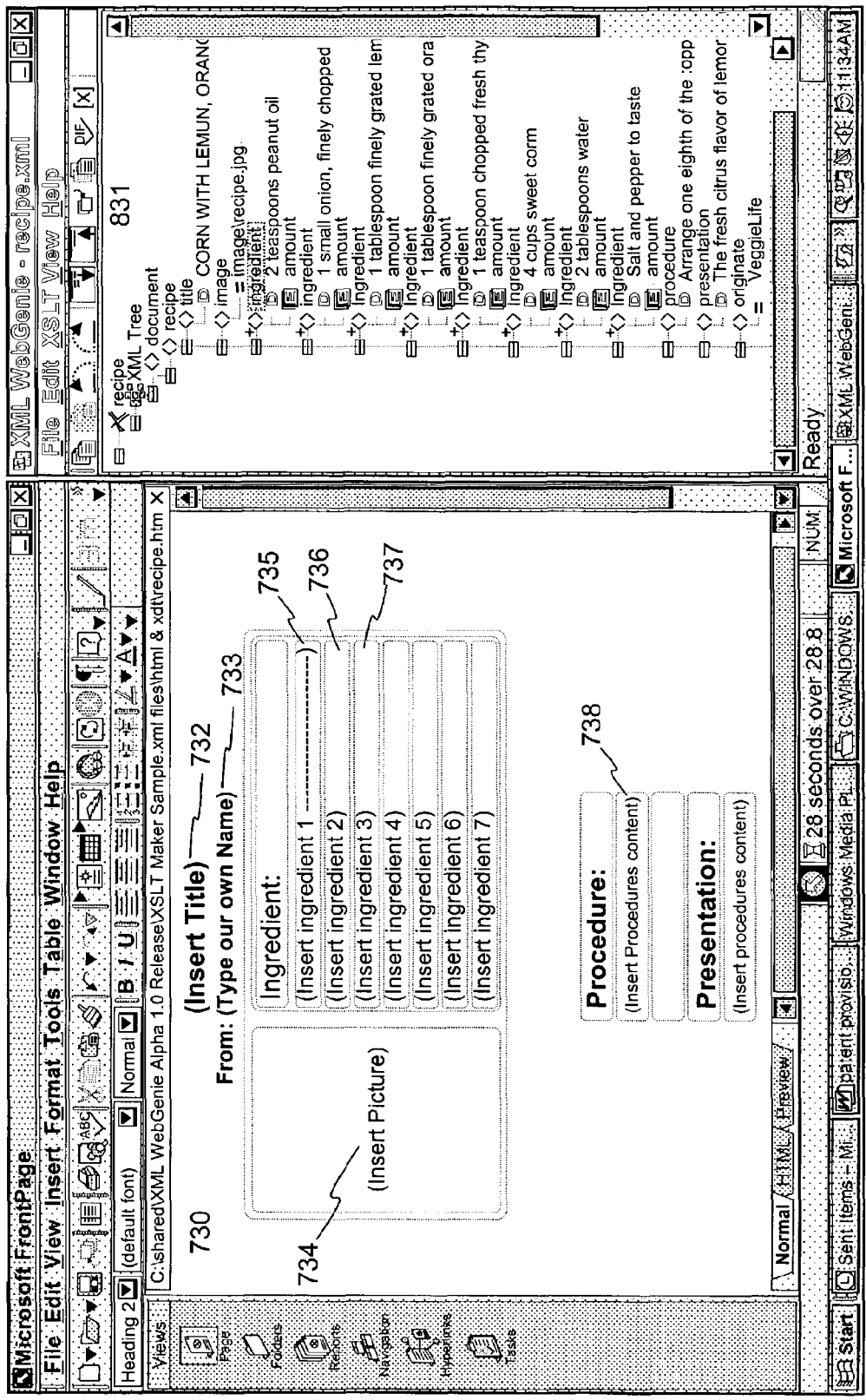
Figure 7D:
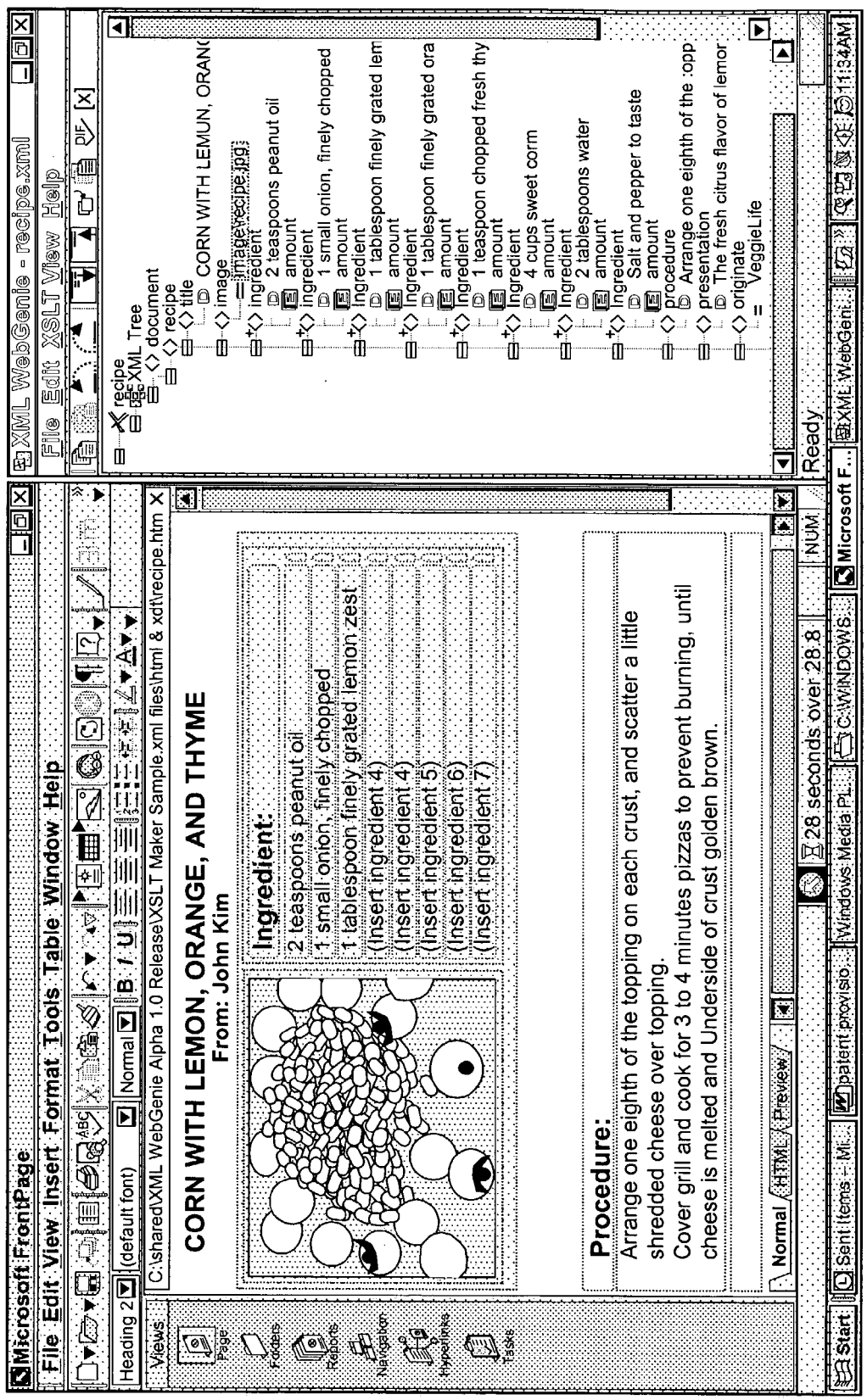

FIG. 7C shows a pre-designed html document in Microsoft FrontPage environment 730, and the visualization 731 of the XML document (e.g., XMLCitites's XMLWebGenie environment). FIG. 7C also shows references 732, 733, 734, 735, 736, and 737 as examples of the instruction on where to put the XML content into the HTML document. FIG. 7D shows a pre-designed html document with inserted associated meta-tag information in Microsoft FrongPage environment, and the visualization of an XML document in XMLCitites's XMLWebGenie environment. FIG. 7D shows that associated meta-tag information has been inserted on the HTML document. After the insertion of associated meta-tag information into the WYSISWYG editors, user may further design the looks & feel for the associated meta-tag information through its WYSISWYG tools available from the editors.

Once a user completes creating and editing an HTML file with associated meta-tag information, the HTML file may be further checked and modified for its compliance (i.e., whether it is well-formed) according to the XML specification. According to one embodiment, the file can be loaded into a separate memory through a DOM parser such as Xerces-C++ from www.apache.org. Within the XML parser, any element, attribute, and text data would be individually accessible via the DOM parser API. Within the computer memory, the HTML file can be compared with list of associated meta-tag information already created, and replace the associated meta-tag information found in HTML with meta-tag information that contains DOPI.

Now referring back to FIG. 4A that shows a portion of an HTML document with associated meta-tag information 401, 402, 403, 405, 406, 407, and 408 loaded into a computer memory. FIG. 4B shows a portion of the HTML document in which the associated meta-tag information 401, 402, 403, 405, 406, 407, and 408 of FIG. 4A are now replaced with meta-tag information 411, 412, 413, 414, 415, 416, and 417 of FIG. 4B that contains DOPI.

FIG. 4C shows a portion of the HTML document with meta-tag information now transformed into XSLT via a preferred embodiment of the present invention. Notice that header information 431 has been inserted into the HTML document of FIG. 4B. Further, associated meta-tag information 411, and 412 have been replaced by meta-tag information 432 and 433, in which the DOI of the meta-tag information 432 is used as the attribute value and the DOI of the meta-tag information 422 is used as the attribute value of select in the meta-tag information 433. FIG. 4C also shows that a block 420 of FIG. 4B has been replaced by the information 437 in FIG. 4C.

Figure 4D:
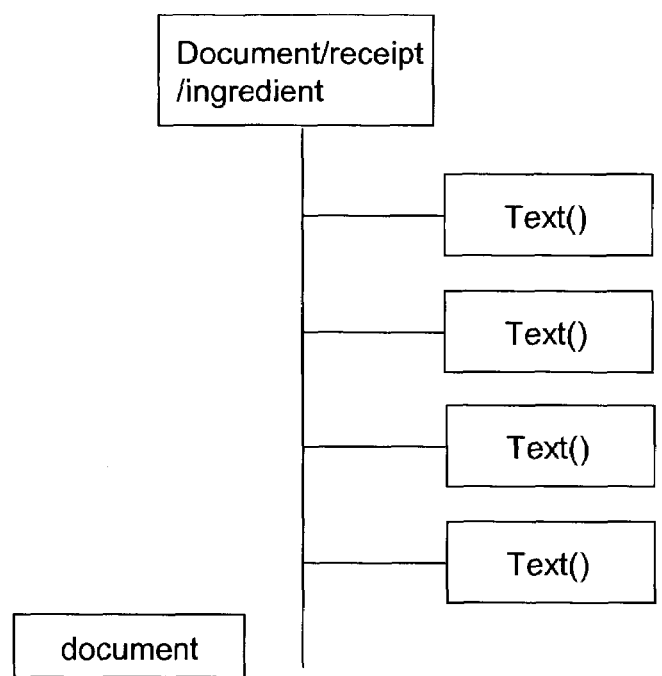
FIG. 4D shows a corresponding tree representation of the DOPI for the data block 420 in FIG. 4A.

FIG. 4D shows a corresponding tree representation of the DOPI for the data block 420 in FIG. 4A. In particular, The DOPI of 420 is "document/recipe/<xsl:for-each>ingredient/text( )</xsl:for-each>" and the repeating consecutive elements except one that contain "document/recipe/<xsl:for-each>ingredient/text( )</xsl:for-each> has been removed and the one remained has been modified as 437. Notice that the FIG. 4B the <xsl:for-each> of DOPI 420 shows that user desires the text( ) elements to repeat independent to the particular XML file used as a source file and that any XML file that complies to the same DTD used by the XML file that contains arbitrary number of text( ) elements under the "Document/recipe/ingredient" will have the same HTML tags, i.e. presentation.

By requiring that users insert at least two of the repeating associated meta-tag information into an HTML document with the same HTML tags, the HTML document can be analyzed with the associated meta-tag information to meet user's requirement. FIG. 4B shows that 413 and 414 are repeating elements and the rest of them also show that the set of the HTML tags that contains the same DOPI that also repeats.

For DOPI that contains plural user requirement, the present invention method uses a looped process such that the first HTML elements that contain the plural user requirement becomes the beginning of the loop and the last repeating DOPI. If there are any identifiers such as for <xsl:for-each>, it would be the end of the loop for the software based analysis.

Figure 4E:
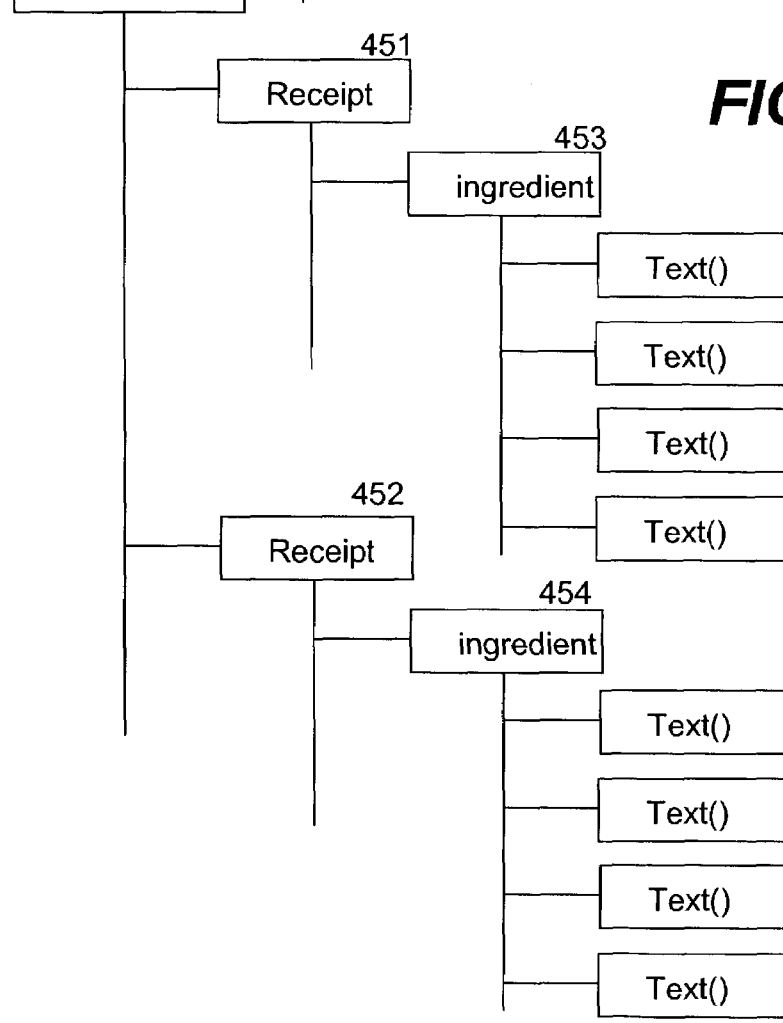
FIG. 4E shows a DOM tree representation of an XML document that contains multiple recipe elements, and ingredient elements.

For example if DOPI is "Document/<xsl:for-each>recipe/<xsl:for-each>ingredient/text(     )<xsl:for-each></xsl:for-each>", the DOPI shows the user requires that for the XML document that contains multiple recipe elements, every repeating recipe element's "ingredient/text( )" would be displayed. Further, the user requires that for each recipe element, every repeating "ingredient/text( )" to be displayed. FIG. 4E shows the DOM tree representation of an XML document that contains multiple recipe elements 401 and 402, and ingredient elements 403 and 404.

Figure 7E:
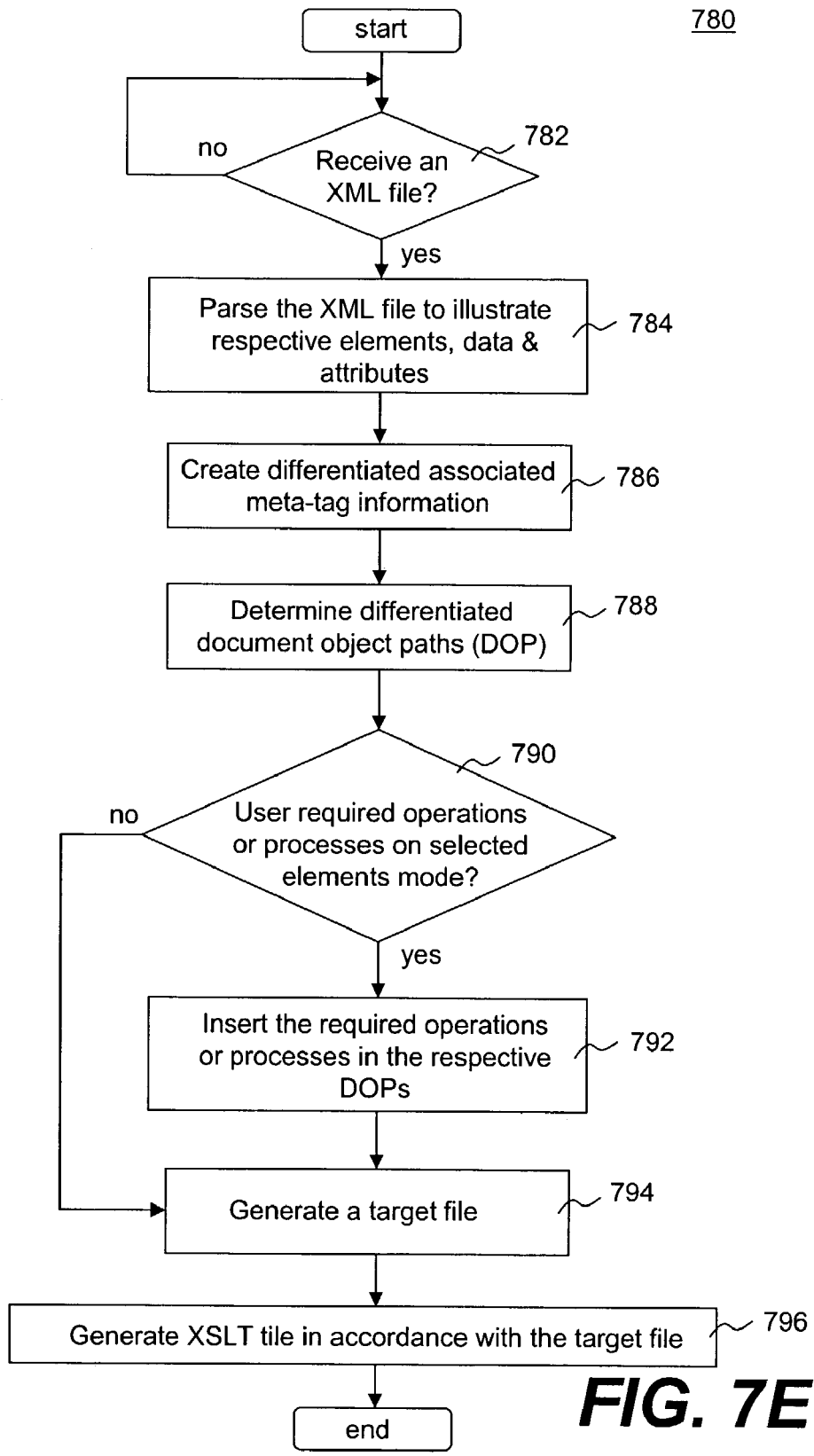
FIG. 7E shows a flowchart or process of inserting user required operations in a markup language file.

Referring now to FIG. 7E, there shows a flowchart or process 780 of inserting user required operations in a markup language file. According to one embodiment, the process 780 awaits a file to be processed at 782. Upon receiving the file (e.g. an XML file), the process at 784 parses the XML file to illustrate respective elements, data and attributes, preferably, in a tree structure to show inherent hierarchical relationships among the respective elements, data and attributes.

At 786, all associated meta-tag information are differentiated, which may be achieved by applying the process 620 of FIG. 6B to differentiate all associated meta-tag information in the source file. In accordance with the associated meta-tag information, respective document object paths are determined at 788. In one embodiment, meta-tag information are first obtained respectively from the associated meta-tag information. The corresponding document object paths are then determined.

At 790, it now possible to input user required operations (including functionalities or processes) based on some or all of the document object paths for the desired stylesheet. If there are no such user required operations, then the process 780 goes to 794 where an HTML may be generated. If the user does have user required operations or functionalities to be proceeded, the process 780 goes to 792 where the user required operations can be selectively placed based on the selected document object paths so as to form respective document object path information.

As described above, a special operator or tag in accordance with a desired operation (or function) is inserted in a selected document object path to form document object path information. As a result, a source file now includes differentiated document object path information and the process 780 goes to 794 to generate an HTML file. With the HTML that can be displayed in a browser application, a user may perform various adjustment and modifications (e.g., creating customized tags) with respect to the source file. Subsequently, at 796, one or more XSL files can be generated in accordance with the HTML, assuming the HTML is what is desired by the user.

From the above examples, one can see that an XSL file is a combination of the target file, such as HTML, WML, or XML, and <xsl:> tags to associate the information from the source XML file and/or through the source XML's DTD or schema file. For conversion of an HTML or WML file into XML and XSLT, XML must contain the content portion of the converted HTML or WML file, and the XSLT file must contain the presentation information of the converted HTML or WML file.

According to one aspect of the present invention, a technique is developed to convert source files (e.g., HTML, WML, XML, or RTF) that contain both content and presentation information to XML and DTD files, thus dynamically importing the content of the source files to XML files through clipboard, drag-and-drop mechanisms, or OLE data transfer mechanisms. The technique includes exporting the XML files and DTD files from an XDTD file that contains information from both the XML and DTD files, and generating an XSLT file by cross referencing the HTML file, and/or XML files, and/or DTD files with the meta-tag information and/or associated meta-tag information. One of the features in the present invention is that XSL files are created independent of the source files by utilizing the target file's environment (e.g., an authoring tool).

Figure 8A:
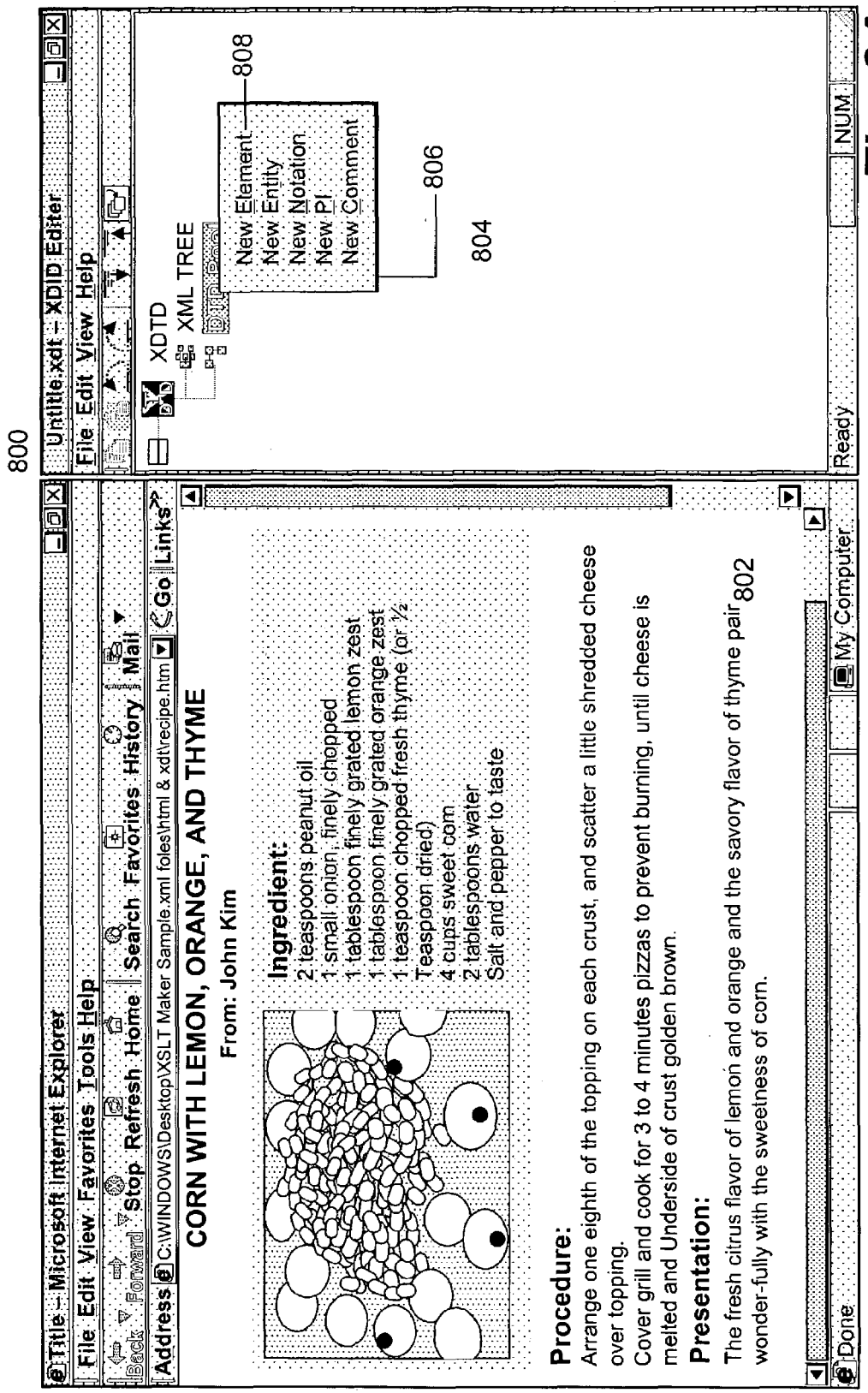

FIG. 8A shows an editing environment 800 that includes two displays 802 and 804. The display 802 displays an HTML file and may be from one of the commonly used authoring tools or applications (e.g., Microsoft Internet Explorer or Microsoft Word). The display 804 provides a graphic user interface to allow the editing and creation of corresponding XML elements and or DTD elements to facilitate subsequently the creation of XSL files. One exemplary editing environment 800 may be provided as XDTD Editor from XMLCities, Inc. located at 1617A S. Main Street, Milpitas, Calif. 95035.

Figure 8B:
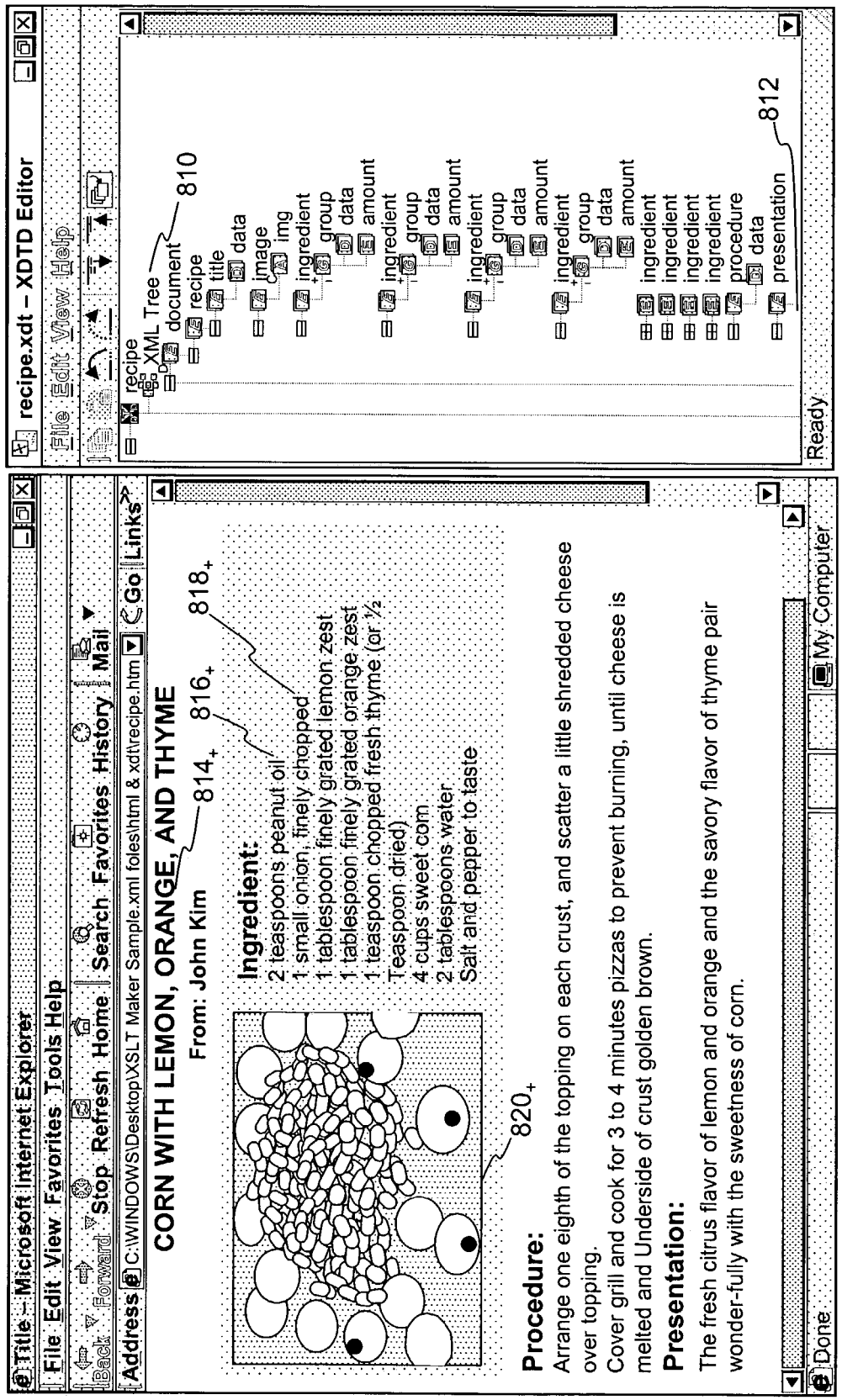

In the graphic user interface 804, once a new element is selected, the user can assign an identifier (e.g., One, or Zero) to it and also delete and modify the elements. FIG. 8B shows the content of the HTML together with the corresponding XML tree 810 and the DTD Pool 812. Subsequently, the user can copy a portion of the HTML data content (e.g., 816 or 818 of FIG. 8B) and insert it to the interface 804 as data 811 of the "title" element in the XML tree 810, through a clipboard, a drag-and-drop mechanism or an OLE data transfer mechanism. Any portion of the data including the address of the image file 820 of HTML file can be copied from the HTML file to any data or attribute node of the XML tree 810.

After the user dynamically imports a portion or all of the content of an HTML file into an XML Tree in XDTD Editor, the XML containing the content portion of the HTML file is created. Likewise, a corresponding DTD file can be created as well.

Once a user creates an XML file and/or DTD file, an XSL/XSLT file can be created to reflect the look and feel for the XML file as a source file either as shown in HTML file or in any other way other than the text based view of the XML file. To create an XSL/XSLT file, cross-referencing of source files is required if one of source files contains associated meta-tag information. According to one embodiment, a process implemented in software is configured to automate the cross-reference between the HTML file and the XML tree for the XSL/XSLT creation.

In operations, an XML file can be stored in computer memory using an XML parser such as Document Object Module (DOM) Core of World Wide Web Consortium (W3), and use its API such as parentNode( ), nextsibling( ), childNodes( ), getNodeName( ), nodeName( ), and nodeValue( ) to search for any meta-tag information. DOM developed by the World Wide Web Consortium is a programming interface specification that enables a programmer to create and modify HTML pages and XML documents as program objects. The DOM presents the XML document as a hierarchy of Node objects that also can be easily manipulated using its APIs.

With the XML document shown as a hierarchy of node objects, the element 822 of FIG. 8C can be used as associated meta-tag information to obtain its meta-tag information by positioning the DOM parser pointer at the root element of the DOM Tree, by using nodeName( ) to identify and store the name of the root element in a separate memory as {xc_xslt: document}, by using NodeValue( ) to compare its node value with the element 822. If they are not equal, use firstChild( ) to travel to its first child element, i.e. the "recipe" element, use nodeName( ) to identify and store the node name in the same memory location where {xc_xslt: document} is stored by concatenating the content of the memory location with the new node name "recipe as {xc_xslt: document/recipe}, and compare its nodeValue( ) with the element 822. Using the above method recursively, one can obtain the meta-tag information such as {xc_xslt:document/recipe/title} for the element 822 while using the node 820 to stop the recursive loop when the nodeValue( ) equals to the element 820.

Accordingly, the user can obtain the meta-tag information respectively for the element 824, 826, and 828 of FIG. 8C using the reverse of the recursive method. the user can first find all the data nodes that contain associated meta-tag information, and build the meta-tag information by using parentNode( ) API of the DOM parser while reversibly concatenating the meta-tag information such that {xc_xslt: title} to {xc_xslt:recipe/title} and {xc_xslt:recipe/title} to {xc_xslt:document/recipe/title}.

In another embodiment, the user can also obtain the meta-tag information for the element 822, 826, or 828 of FIG. 8C by using the same recursive method with an added condition such that the DOM Parser pointer will skip an element node using nextsibling 0 from concatenating its name for its meta-tag information building if its node Value( ) is equal to an associated meta-tag information. Therefore, the element 824, 826, or 828 of FIG. 8C are associated meta-tag information since their meta-tag information is built through association.

Users may further design the look-and-feel of the target presentations in the WYSIWYG authoring tools with inserted meta-tag information and/or associated meta-tag information. The target files with meta-tag information and/or associated meta-tag information will be loaded into an XSL/XSLT converter, which automatically generates the resulting XSL/XSLT files that match the look-and-feel of the target presentations in the WYSIWYG authoring tools. In one embodiment, if the targeted file contains the associated meta-tag information, the associated meta-tag information can be used to find the meta-tag information of an XML document that contains corresponding associated meta-tag information of targeted file, and replace the associated meta-tag information of the targeted file with the meta-tag information of the XML document during XSL/XSLT file creation process.

In one embodiment, a simple automatic XSLT conversion can be configured as follows. An HTML file with meta-tag information and associated meta-tag information will be first checked and edited for its well-formedness according to the XML standard while preserving its look-and-feel of the HTML file when viewed by a web-browser. The most important changes that must be made in HTML files are such that all tags have distinct start and end components, empty elements are formatted correctly, all attribute values are quoted, and all tags are nested correctly. Once necessary changes are made for the HTML file to confirm the well-formedness check of XML standard, the HTML file can then be loaded into a computer memory via an XML Parser such as the one defined by World Wide Web consortium (W3) as DOM Core.

Once the HTML file is loaded into a user's computer memory by the DOM Parser as a hierarchy of Node objects, the APIs of the DOM Parser can be used to first isolate the HTML document's data node values and attribute node values. If the HTML file contains associated meta-tag associations, an XML file with/without associated DTD file that contains matching associated meta-tag information can be used to determine its meta-tag information. Once the meta-tag information is determined from an XML file, the associated meta-tag information will be replaced with the found meta-tag information.

One of the features in the present invention is storing all the XML data and Attributes in a separate memory where each XML data or attributes also contains information or links to information about its meta-tag information. The meta-tag information will be containing the information about its parent element and the parent element's relationship with the root elements so that the meta-tag information will be sufficient to address its correct attribute value for select in <xsl:value of select="">. The data and the attributes of the XML document and their corresponding meta-tag information will be stored in an order such that the data or attributes can be accessed in the order of largest length to the smallest length.

The method receives a processed HTML document that contains the data or attributes of an XML document. The method then identifies data of the HTML document and compares the data with the set of the XML data or attribute stored in a separate memory. The method then compares and identifies the data with the data or attributes stored in the separate memory in the order of the length of the string to determine if the largest matching XML data or attribute is included in the HTML data.

FIG. 8D shows an example of HTML document that contains an element with broken XML text data and shows an element <p/> 830 that contains the text data "C++ Programming" that is further broken into two separate text data "C++" 831 and "Programming" 832. In other words, the text data "C++" 831 is now a child of the <b/> element that is the child of <p/> element 830 and "Programming" is a child of <p/> element 830. However, it is understood, even though the text data "C++ Programming" is broken into two parts, a browser will show "C++ Programming" as a whole text with only "C++" in bold character.

For broken text data as associated meta-tag information in an HTML element, according to one embodiment, the first text data 831 of the child element of the 830 will be put into a separate memory and the next text data 832 as the next consecutive child element of 830 will be stored next to 830 in the separate memory. After no more next child element or child of the child element for the given element is found, the XML file will be searched for text data or attribute for matching. When a match is found, the entire content of the 830 would be replaced with the meta-tag information that will later be replaced as <xsl:value of select="root/book[1]/name/text( )"/>.

With all the meta-tag information of the HTML document loaded in the computer memory, all the meta-tag information will be further manipulated such that if exemplary meta-tag information is {xc_xslt:document/recipe/title}, it will be replaced as <xsl:value-of select="document/recipe/title">. If the meta-tag information is a value of an attribute node in the HTML document as in the element 824 of FIG. 8C, the meta-tag information can be replaced as {document/recipe/image/@img}. Meta-tag information and the structure of the HTML document in the XML Parser can be further changed so that it can support any of the XSLT Elements of user's choice.

The declaration of XSLT will be added at the beginning of the parsed HTML document using the XML parser API (DOM Core) as <?xml version='1.0' encoding='ISO-8859-1' standalone='yes' ?><xsl:stylesheet version="1.0" xmlns:xsl="http://www.w3.org/1999/XSL/Transform"><xsl:template match="/"> will also be added after the XSLT declaration, and </xsl:template> </xsl:stylesheet> will be added at the end of parsed HTML document using the API of an XML Parser to transform the parsed HTML document as a valid XSLT document and output the XSLT document as a valid XSL file as in FIGS. 8E.1, 8E.2 and 8E.3.

Figure 9A:
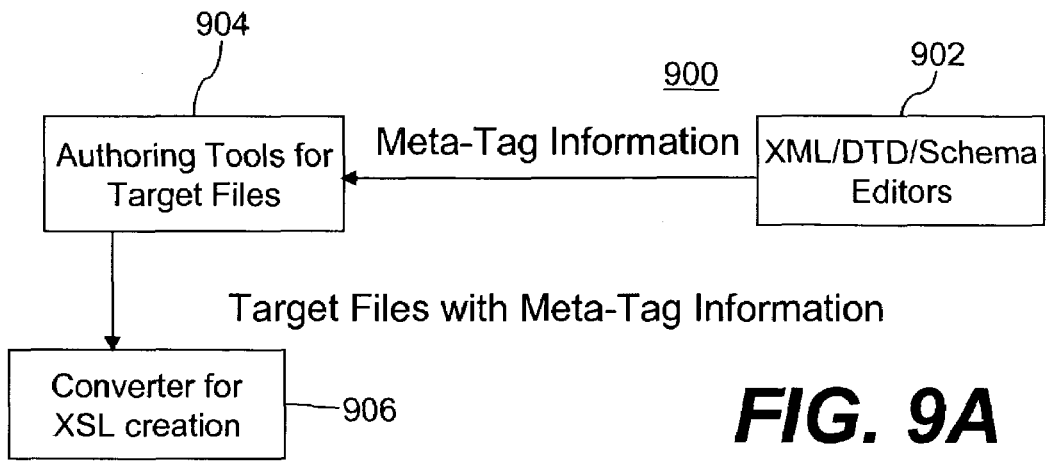
FIG. 9A illustrates a block diagram in which a target file with meta-tag information is created by an authoring tool and converted into one or more XSL files through a converter.

FIG. 9A illustrates a block diagram 900 in which a target file with meta-tag information is created by an authoring tool 904 and converted into one or more XSL files through a converter 906. In particular, the meta-tag information is inserted in the authoring tools by directly typing the meta-tag declarations or through clipboard, drag-and-drop mechanisms, or OLE data transfer mechanisms, from an XML/DTD/schema editor 902.

Figure 9B:
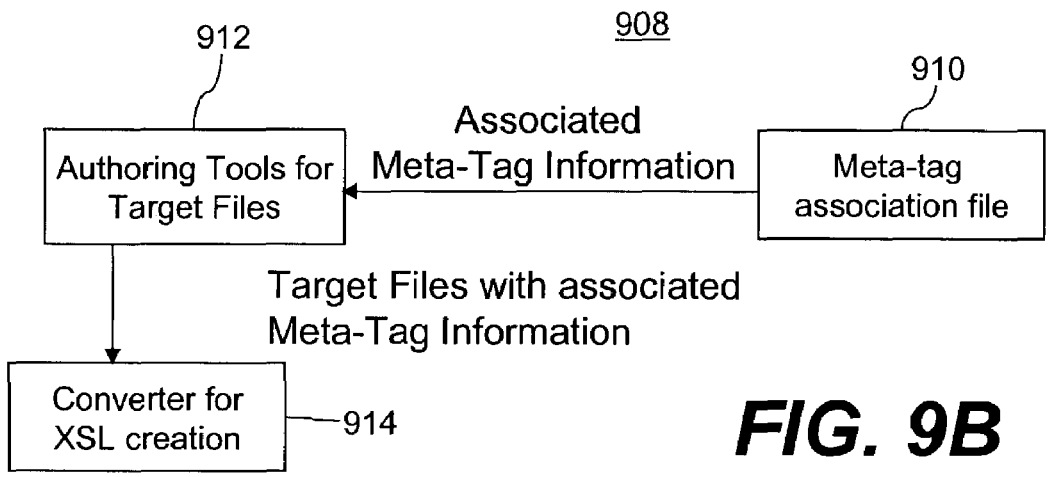
FIG. 9B illustrates a block diagram in which a target file with associated meta-tag information is created by an authoring tool and converted into one or more XSL files through a converter.

FIG. 9B illustrates a block diagram 908 in which a target file 912 with associated meta-tag information is created by an authoring tool 912 and converted into one or more XSL files through a converter 914. The associated meta-tag information is inserted in the authoring tools by directly typing the associated meta-tags or through clipboard, drag-and-drop mechanisms, or OLE data transfer mechanisms, from a meta-tag association file 910. The meta-tag association file is then used by the converter 914 for XSL creation to extract necessary information such as meta-tag information from associated meta-tag information for generating XSLT that will create the look and feel of targeted file in targeted file format from any XML file with the same or similar DTD or schema.

Figure 9C:
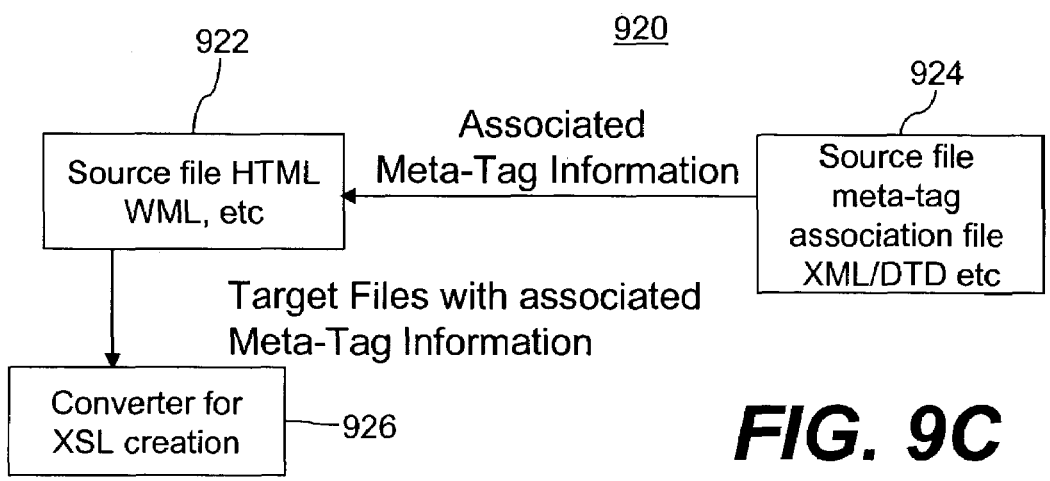
FIG. 9C illustrates a block diagram in which a target file with meta-tag information and/or associated meta-tag information is created by source files, where the source files may include one or more HTML files and the source files are one or more XML files for content management.

FIG. 9C illustrates a block diagram 920 in which a target file with meta-tag information and/or associated meta-tag information is created by source files 922 and 924 where the source files 922 may one or more HTML files and the source files 924 are one or more XML files for content management. The source files 922 may be a WML file or RTF file and the source files 924 is may be the same XML file or a different XML file for content management. The source file 924 is may be an XDTD file that contains the combined information of an XML file and a DTD file. In any case, the source file 922 contains the meta-tag information or associated meta-tag information of the source file 922. The source files 924 and 922 will be used to generate XSLT that will create the look and feel of targeted file in targeted file format from any XML file with the same or similar DTD or schema of 922.

Figure 9D:
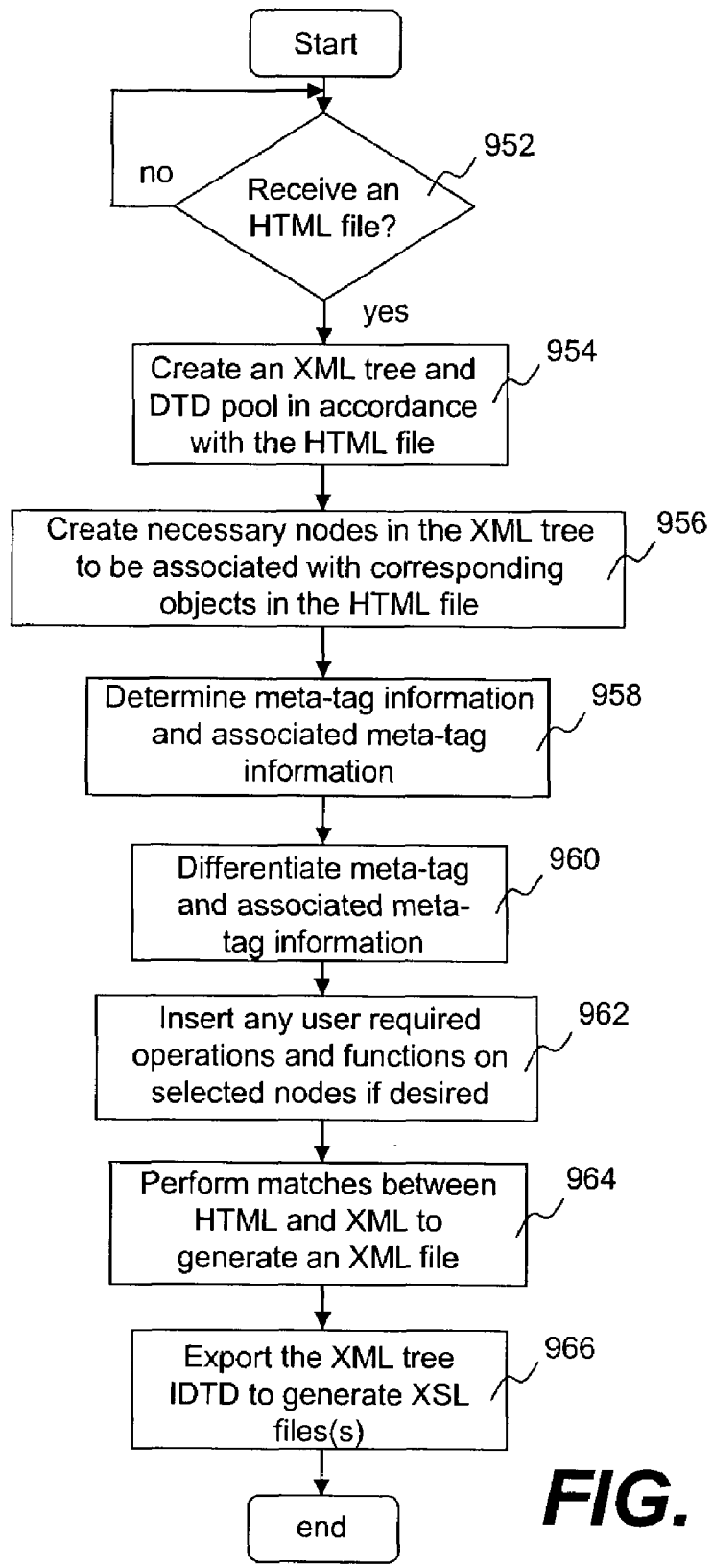
FIG. 9D shows a flowchart of generating one or more stylesheets from one or more source files (e.g., HTML files) according to one embodiment of the present invention.

FIG. 9D shows a flowchart 950 of generating one or more stylesheets from one or more source files (e.g., HTML files) according to one embodiment of the present invention. To facilitate the description of the process 950, it is assumed that only one HTML source file is provided to generate an XSL file. The description below can be appreciated that it is equally applied to other instances that involving more than one source files and resultant XSL/XSLT files.

As described above, a graphic environment is provided. The environment includes at least two displays, a first display (window) for displaying an HTML file and a second display (window) for editing a corresponding XML tree and/or DTD for the HTML file. The first display may be from any one of the commonly used browser or application. Thus at 952, the process 950 determines if the HTML has been loaded and displayed in the first display. When the HTML is received and properly displayed, the process goes to 954 where a user can create a corresponding XML tree and a DTD for the display of the HTML file. The XML tree is created by associating each of the (separable) objects in the HTML, such as a group of texts, a sign or an image, with a node in the XML tree. Based on the relationships among the objects, the nodes in the XML tree may be classified as a parent node, a child node or even a grand-child node (or optionally, first-level, second-level and third-level node and so on).

At 958, each of nodes is determined for meta-tag information or associated met-tag information depending on the nature of a node with respect to the object in the HTML file. As described above, it is likely that some of the meta-tag information may be identical, at 960, all identical meta-tag and associated meta-tag information are differentiated using the process 620 of FIG. 6B. If a user desires to input required operations or functionalities on any of the document object path (out from the corresponding meta-tag or associated meta-tag information), at 962, corresponding document object path information may be implemented, for example, using the process 780 of FIG. 7E.

At 964, a matching process is enacted on the XML tree to generate a corresponding XML file. The matching process, as described, is based on the meta-tag or associated meta-tag information, together with document object path information, if there are any, to generate the XML files.

With the XML files and the corresponding DTD, a user may display the XML file in accordance with the DTD and compare with the original display of the HTML. The user may perform necessary adjustments if desired. In any event at 966, the XML tree and the DTD are exported to generate the XSL files.

The invention is preferably implemented by software or a combination of hardware and software, but can also be implemented in hardware. The invention can also be embodied as computer readable code on a computer readable medium. The computer readable medium is any data storage device that can store data which can thereafter be read by a computer system. The computer readable medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:

1. A method for designing extensible stylesheets in a visual graphic environments, the method comprising:
   providing the graphic user interface environment in a computing device, the graphic user interface environment including at least a first display and a second display;
   displaying a source file in the first display, the displayed source file including a plurality of objects;
   creating a tree structure in the second display;
   associating each of the objects with one of associated nodes in the tree structure in the second display by associated meta-tag information, and representing each of the associated nodes as an icon, the icon being labeled with a corresponding text from the source file when the each of the associated nodes pertains to one of the objects in the displayed source file;
   determining any of associated nodes of the tree structure being identical;
   if there are some of the associated nodes being identical, modifying the some of the associated nodes with distinct identifiers such that the some of the associated nodes are uniquely identified; and
   creating a stylesheet from the tree structure with the associated nodes being uniquely identified in accordance with the displayed source file, which further includes: generating from the tree structure a markup language file including a plurality of elements, each of the elements corresponding to one of the nodes in the tree structure, differentiating the elements if there are any of the elements being identical, and generating a resultant file from the markup language file in accordance with a DTD file of the displayed source file, the resultant file being the stylesheet; and
   obtaining corresponding meta-tag information from the associated meta-tag information.

2. The method of claim 1, wherein the source file is associated with a DTD file, and the method further comprising generating the tree structure from the DTD file.

3. The method of claim 2, wherein the source file is a markup language file.

4. The method of claim 3, wherein the markup language file is selected from a group consisting of an HTML file, a WML file, an XML file and a RTF file.

5. The method of claim 1, wherein the meta-tag information pertains to information about association of one of the nodes with another one or more of the nodes in the tree structure.

6. The method of claim 1, wherein the associated meta-tag information of one of the nodes in the tree structure pertains to association information about the one of the nodes with the one of associated objects.

7. The method of claim 1, wherein the markup language file is an XML file, and the resultant file is an XLS or XSLT file.

8. The method of claim 7, wherein the differentiating of the elements comprising:
   identifying one of the elements as a reference;
   determining if any of the elements except for the reference are identical to the reference; and
   inserting one of identifiers to each of some of the elements when the some of the elements are determined to be identical to the reference, wherein each of the identifiers is different from each other, and the some of the elements are uniquely differentiated by the identifiers.

9. A method for designing extensible stylesheets in a visual graphic environments, the method comprising:
   providing the graphic user interface environment including at least a first display and a second display;
   displaying a source file in the first display, the displayed source file including a plurality of objects, each being a group of texts, an image, or a sign, the source file associated with a DTD file;
   creating an tree structure in the second display from the DTD file;
   associating each of the objects with one of associated nodes by associated meta-tag information, and dragging the each of the objects from the first display to the one of the nodes in the second display through a clipboard or a drag-and-drop mechanism in an operating system or an OLE data transfer mechanism, wherein the nodes are located in the tree structure in accordance with the DTD file, and whenever some of the associated nodes are determined identical, distinct identifiers are added to make the some of the associated nodes distinctive, and as a result, all of the associated nodes are uniquely labeled, and the tree structure subsequently shows hierarchical relationships of the objects;
   creating an XML file from the tree structure to contain contents respectively representing the objects; and
   creating an XSL or XSLT file from the XML file using the associated meta-tag information therein, which comprises converting the XML file into another file in accordance with the DTD file, obtaining corresponding meta-tag information from the associated meta-tag information, and adding XSL declaration at the beginning of the another file.

10. The method of claim 9, further comprising obtaining corresponding meta-tag information from the associated meta-tag information.

11. The method of claim 10, wherein the meta-tag information pertains to information about association of one of the nodes with another one or more of the nodes in the tree structure.

12. The method of claim 10, wherein the associated meta-tag information of one of the nodes in the tree structure pertains to association information about the one of the nodes with the one of associated objects.

13. The method of claim 9, wherein the associating of the each of the objects with one of the nodes by the associated meta-tag information comprises receiving typed entries from a user for the one of the nodes to indicate that the each of the objects is assigned to the one of the nodes.

14. The method of claim 9, wherein the creating of the XML file from the tree structure comprises traversing the nodes in the tree structure.

15. A software product including computer program code for designing extensible stylesheets, the software product loaded in a computer readable storage medium and executable in a computing device operating under a window operating system, the software product comprising:

provide program code for providing a graphic user interface environment including at least a first display and a second display;

program code for displaying a source file in the first display, the displayed source file including a plurality of objects, the source file associated with a DTD file;

program code for creating a tree structure in the second display from the DTD file;

program code for associating each of the objects with one of associated nodes in the tree structure in the second display by associated meta-tag information, the nodes located in the tree structure in accordance with the DTD file, each of the nodes represented as an icon labeled with a corresponding text from the source file when the each of the nodes is associated with one of the objects in the displayed source file;

program code for determining any of associated nodes of the tree structure being identical;

if there are some of the associated nodes being identical, program code for modifying the some of the associated nodes with distinct identifiers such that the some of the associated nodes are uniquely identified;

program code for creating a stylesheet from the tree structure with the associated nodes being uniquely identified in accordance with the displayed source file, wherein the creating program code includes program code for generating from the tree structure a markup language file including a plurality of elements, each of the elements corresponding to one of the nodes in the tree structure, program code for differentiating the elements if there are any of the elements being identical, program code for generating a resultant file from the markup language file in accordance with a DTD file of the displayed source file, wherein the resultant file is the stylesheet; and program code for obtaining corresponding meta-tag information from the associated meta-tag information.

16. The software product of claim 15, wherein the program code for differentiating the elements comprising:

program code for identifying one of the elements as a reference;

program code for determining if any of the elements except for the reference are identical to the reference; and program code for inserting one of identifiers to each of some of the elements when the some of the elements are determined to be identical to the reference, wherein each of the identifiers is different from each other, and the some of the elements are uniquely differentiated by the identifiers.

17. A software product including computer program code for designing extensible stylesheets, the software product loaded in a computer readable storage medium and executable in a computing device operating under a window operating system, the software product comprising:

program code for providing the graphic user interface environment including at least a first display and a second display;

program code for displaying a source file in the first display, the displayed source file including a plurality of objects, each being a group of texts, an image, or a sign;

program code for creating an tree structure in the second display from the DTD file;

program code for associating each of the objects with one of associated nodes by associated meta-tag information, the nodes located in the tree structure in accordance with the DTD file, wherein whenever some of the associated nodes are determined identical, distinct identifiers are added to make the some of the associated nodes distinctive, and as a result, all of the associated nodes are uniquely identified, and the tree structure subsequently shows hierarchical relationships of the objects;

program code for creating an XML file from the tree structure to contain contents respectively representing the objects;

program code for creating an XSL or XSLT file from the XML file using the associated meta-tag information therein, which further includes program code for converting the XML file into another file in accordance with the DTD file, program code for obtaining corresponding meta-tag information from the associated meta-tag information, and program code for adding XSL declaration at the beginning of the another file; and program code for obtaining corresponding meta-tag information from the associated meta-tag information, wherein the meta-tag information pertains to information about association of one of the nodes with another one or more of the nodes in the tree structure, and the associated meta-tag information of one of the nodes in the tree structure pertains to association information about the one of the nodes with the one of associated objects.

18. The software product of claim 17, wherein the program code for associating the each of the objects with one of the nodes by the associated mete-tag information comprises program code for allowing dragging of the each of the objects from the first display to the one of the nodes in the second display through a clipboard, a drag-and-drop mechanism in an operating system or an OLE data transfer mechanism.

19. The software product of claim 17, wherein the program code for associating the each of the objects with one of the nodes by the associated meta-tag information comprises program code for receiving typed entries from a user for the one of the nodes to indicate that the each of the objects is assigned to the one of the nodes.

20. The software product of claim 17, wherein the program code for creating the XML file from the tree structure comprises program code for traversing the nodes in the tree structure.

* * * * *